US007809777B2

(12) United States Patent
Dodge

(10) Patent No.: US 7,809,777 B2
(45) Date of Patent: Oct. 5, 2010

(54) FILE SYSTEM HAVING DEFERRED VERIFICATION OF DATA INTEGRITY

(75) Inventor: Dan Dodge, Nepean (CA)

(73) Assignee: QNX Software Systems GmbH & Co. KG, Hannover (DE)

(*) Notice: Subject to any disclaimer, the term of this patent is extended or adjusted under 35 U.S.C. 154(b) by 251 days.

(21) Appl. No.: 11/173,808

(22) Filed: Jul. 1, 2005

(65) Prior Publication Data
US 2007/0005614 A1 Jan. 4, 2007

(51) Int. Cl.
G06F 12/00 (2006.01)
G06Q 20/00 (2006.01)

(52) U.S. Cl. .......................... 707/826; 705/75
(58) Field of Classification Search ................ 702/119; 710/10; 713/1; 707/100, 200, 202, 609, 707/648, 694, 705, 758, 821–830
See application file for complete search history.

(56) References Cited

U.S. PATENT DOCUMENTS

| 4,882,703 A | 11/1989 | Nicolai |
| 4,926,317 A | 5/1990 | Wallach et al. |
| 4,945,475 A | 7/1990 | Bruffey et al. |
| 5,187,786 A | 2/1993 | Densmore et al. |
| 5,201,044 A * | 4/1993 | Frey et al. ............. 714/20 |
| 5,222,217 A | 6/1993 | Blount et al. |
| 5,369,757 A | 11/1994 | Spiro et al. |
| 5,375,233 A | 12/1994 | Kimber et al. |
| 5,454,103 A | 9/1995 | Coverston et al. |
| 5,455,944 A * | 10/1995 | Haderle et al. ........... 707/202 |
| 5,530,849 A | 6/1996 | Hanushevsky et al. |
| 5,726,989 A | 3/1998 | Dokic |
| 5,765,172 A | 6/1998 | Fox |
| 5,774,715 A | 6/1998 | Madany et al. |
| 5,806,085 A | 9/1998 | Berliner |
| 5,897,661 A | 4/1999 | Baranovsky et al. |
| 5,960,436 A | 9/1999 | Chang et al. |
| 5,983,293 A | 11/1999 | Murakami |
| 5,995,980 A | 11/1999 | Olson et al. |

(Continued)

FOREIGN PATENT DOCUMENTS

CN 1289966 A 4/2001

(Continued)

OTHER PUBLICATIONS

QNX Software Systems; "Embedded transaction filesystem (ETFS)," System Architecture, 2004, pp. 193-198.

(Continued)

Primary Examiner—Pierre M Vital
Assistant Examiner—Berhanu Mitiku
(74) Attorney, Agent, or Firm—Brinks Hofer Gilson & Lione

(57) ABSTRACT

A computer system employs file system software to maintain a transaction file that includes a plurality of transaction records that each include a header section and a data section. The file system software executes a startup process in which a reconstructed file system is generated in a random access memory. During startup, the file system software selectively verifies only the header section of a transaction record or both the header section and data section of a transaction record based on certain criterion. The transaction records may be stored in Flash memory.

33 Claims, 15 Drawing Sheets

U.S. PATENT DOCUMENTS

| | | | |
|---|---|---|---|
| 6,058,400 A * | 5/2000 | Slaughter | 707/201 |
| 6,175,900 B1 | 1/2001 | Forin et al. | |
| 6,185,663 B1 | 2/2001 | Burke | |
| 6,286,013 B1 | 9/2001 | Reynolds et al. | |
| 6,292,808 B1 * | 9/2001 | Obermarck et al. | 707/202 |
| 6,324,637 B1 | 11/2001 | Hamilton | |
| 6,356,863 B1 | 3/2002 | Sayle | |
| 6,377,992 B1 | 4/2002 | Plaza et al. | |
| 6,389,427 B1 | 5/2002 | Faulkner | |
| 6,389,513 B1 | 5/2002 | Closson | |
| 6,396,421 B1 | 5/2002 | Bland | |
| 6,412,042 B1 * | 6/2002 | Paterson et al. | 711/112 |
| 6,467,021 B1 | 10/2002 | Sinclair | |
| 6,509,850 B1 | 1/2003 | Bland | |
| 6,571,259 B1 | 5/2003 | Zheng et al. | |
| 6,584,582 B1 * | 6/2003 | O'Connor | 714/21 |
| 6,591,376 B1 | 7/2003 | VanRooven et al. | |
| 6,606,628 B1 * | 8/2003 | Monsen et al. | 707/100 |
| 6,661,357 B2 | 12/2003 | Bland | |
| 6,675,177 B1 | 1/2004 | Webb | |
| 6,732,124 B1 | 5/2004 | Koseki et al. | |
| 6,748,491 B2 | 6/2004 | Rodriguez | |
| 6,754,696 B1 | 6/2004 | Kamath et al. | |
| 6,845,401 B1 | 1/2005 | Papadopoulos et al. | |
| 6,856,993 B1 | 2/2005 | Verma et al. | |
| 6,922,708 B1 | 7/2005 | Sedlar | |
| 7,003,619 B1 | 2/2006 | Moore et al. | |
| 7,047,257 B2 * | 5/2006 | Fletcher et al. | 707/201 |
| 7,096,248 B2 | 8/2006 | Masters et al. | |
| 7,139,752 B2 | 11/2006 | Broder et al. | |
| 7,181,463 B2 | 2/2007 | Moore et al. | |
| 7,191,185 B2 | 3/2007 | Dweck et al. | |
| 7,349,927 B2 | 3/2008 | Kanai et al. | |
| 7,383,286 B2 | 6/2008 | Hamanaka et al. | |
| 7,529,784 B2 | 5/2009 | Kavuri et al. | |
| 7,555,483 B2 | 6/2009 | Maeda et al. | |
| 7,565,452 B2 | 7/2009 | Freiburg et al. | |
| 2001/0044798 A1 | 11/2001 | Nagral et al. | |
| 2002/0048223 A1 | 4/2002 | Ota et al. | |
| 2002/0120634 A1 | 8/2002 | Min et al. | |
| 2002/0143862 A1 | 10/2002 | Peterson | |
| 2002/0156840 A1 | 10/2002 | Ulrich et al. | |
| 2002/0156937 A1 | 10/2002 | Wong et al. | |
| 2002/0156938 A1 | 10/2002 | Wong et al. | |
| 2002/0165942 A1 * | 11/2002 | Ulrich et al. | 709/219 |
| 2002/0174295 A1 | 11/2002 | Ulrich et al. | |
| 2003/0065682 A1 | 4/2003 | Nakajima | |
| 2003/0070001 A1 | 4/2003 | Belknap et al. | |
| 2003/0115227 A1 | 6/2003 | Guthery | |
| 2003/0140210 A1 * | 7/2003 | Testardi | 711/203 |
| 2003/0163594 A1 | 8/2003 | Aasheim et al. | |
| 2003/0225585 A1 | 12/2003 | Miller et al. | |
| 2004/0064500 A1 | 4/2004 | Kolar et al. | |
| 2004/0114589 A1 | 6/2004 | Alfieri et al. | |
| 2004/0215600 A1 | 10/2004 | Aridor et al. | |
| 2004/0236793 A1 | 11/2004 | Kanai et al. | |
| 2005/0050073 A1 | 3/2005 | Demiroski et al. | |
| 2005/0091229 A1 * | 4/2005 | Bali et al. | 707/100 |
| 2005/0091287 A1 | 4/2005 | Sedlar | |
| 2005/0117885 A1 | 6/2005 | Lee et al. | |
| 2005/0144526 A1 | 6/2005 | Banko | |
| 2005/0149525 A1 * | 7/2005 | Verma et al. | 707/8 |
| 2005/0210507 A1 | 9/2005 | Hawkins et al. | |
| 2005/0240588 A1 | 10/2005 | Siegel et al. | |
| 2005/0246362 A1 | 11/2005 | Borland | |
| 2005/0251540 A1 * | 11/2005 | Sim-Tang | 707/202 |
| 2005/0256845 A1 | 11/2005 | Jen et al. | |
| 2005/0273486 A1 | 12/2005 | Keith, Jr. | |
| 2006/0015431 A1 | 1/2006 | Bugaj et al. | |
| 2006/0021057 A1 | 1/2006 | Risan et al. | |
| 2006/0074851 A1 | 4/2006 | Nagai et al. | |
| 2006/0117056 A1 | 6/2006 | Havewala et al. | |
| 2006/0136529 A1 | 6/2006 | Pudipeddi et al. | |
| 2006/0190469 A1 | 8/2006 | Kathuria et al. | |
| 2006/0195480 A1 | 8/2006 | Spiegelman et al. | |
| 2006/0206538 A1 * | 9/2006 | Veazey | 707/202 |
| 2006/0242179 A1 | 10/2006 | Chen et al. | |
| 2006/0253502 A1 * | 11/2006 | Raman et al. | 707/202 |
| 2006/0277183 A1 | 12/2006 | Nichols et al. | |
| 2007/0005560 A1 | 1/2007 | Dodge | |
| 2007/0005615 A1 | 1/2007 | Dodge | |
| 2007/0005627 A1 | 1/2007 | Dodge | |
| 2007/0005874 A1 | 1/2007 | Dodge | |
| 2007/0005894 A1 | 1/2007 | Dodge | |
| 2007/0073937 A1 | 3/2007 | Feinberg et al. | |
| 2007/0103984 A1 | 5/2007 | Kavuri et al. | |
| 2007/0113120 A1 | 5/2007 | Dodge | |
| 2007/0185879 A1 | 8/2007 | Roublev et al. | |
| 2007/0198746 A1 | 8/2007 | Myllyla et al. | |
| 2008/0033777 A1 | 2/2008 | Shukoor | |
| 2008/0052323 A1 | 2/2008 | Dodge et al. | |
| 2008/0052329 A1 | 2/2008 | Dodge et al. | |
| 2008/0059510 A1 | 3/2008 | Cardamore et al. | |
| 2008/0126936 A1 | 5/2008 | Williams | |
| 2008/0147747 A1 | 6/2008 | Cardamore | |
| 2008/0228843 A1 | 9/2008 | Dodge et al. | |
| 2009/0037651 A1 | 2/2009 | Gorobets | |
| 2009/0265793 A1 | 10/2009 | Risan et al. | |

FOREIGN PATENT DOCUMENTS

| | | |
|---|---|---|
| CN | 1567256 A | 1/2005 |
| CN | 1705935 A | 12/2005 |
| EP | 0 410 210 A2 | 1/1991 |
| EP | 454340 A2 * | 10/1991 |
| EP | 0 588 488 A1 | 3/1994 |
| EP | 1 089 176 A2 | 4/2001 |
| JP | 62-186361 A | 8/1987 |
| JP | 06-139124 A | 5/1994 |
| KR | 2006-0009717 | 2/2006 |
| KR | 10-2006-00223387 | 3/2006 |
| WO | WO 00/14632 | 3/2000 |
| WO | WO 02/17140 A2 | 2/2002 |
| WO | WO 2006-061454 A1 | 6/2006 |

OTHER PUBLICATIONS

Cárdenas, Alfonso F. "Analysis and Performance of Inverted Data Base Structures." IBM Research Laboratory, San Jose, Communication of ACM May 1975, vol. 18, No. 5, pp. 253-263.

Colyer, A. M. "Displaying and Manipulating Relationships." IBM Technical Disclosure Bulletin, Dec. 1995, vol. 38, Issue No. 12, pp. 391-396.

* cited by examiner

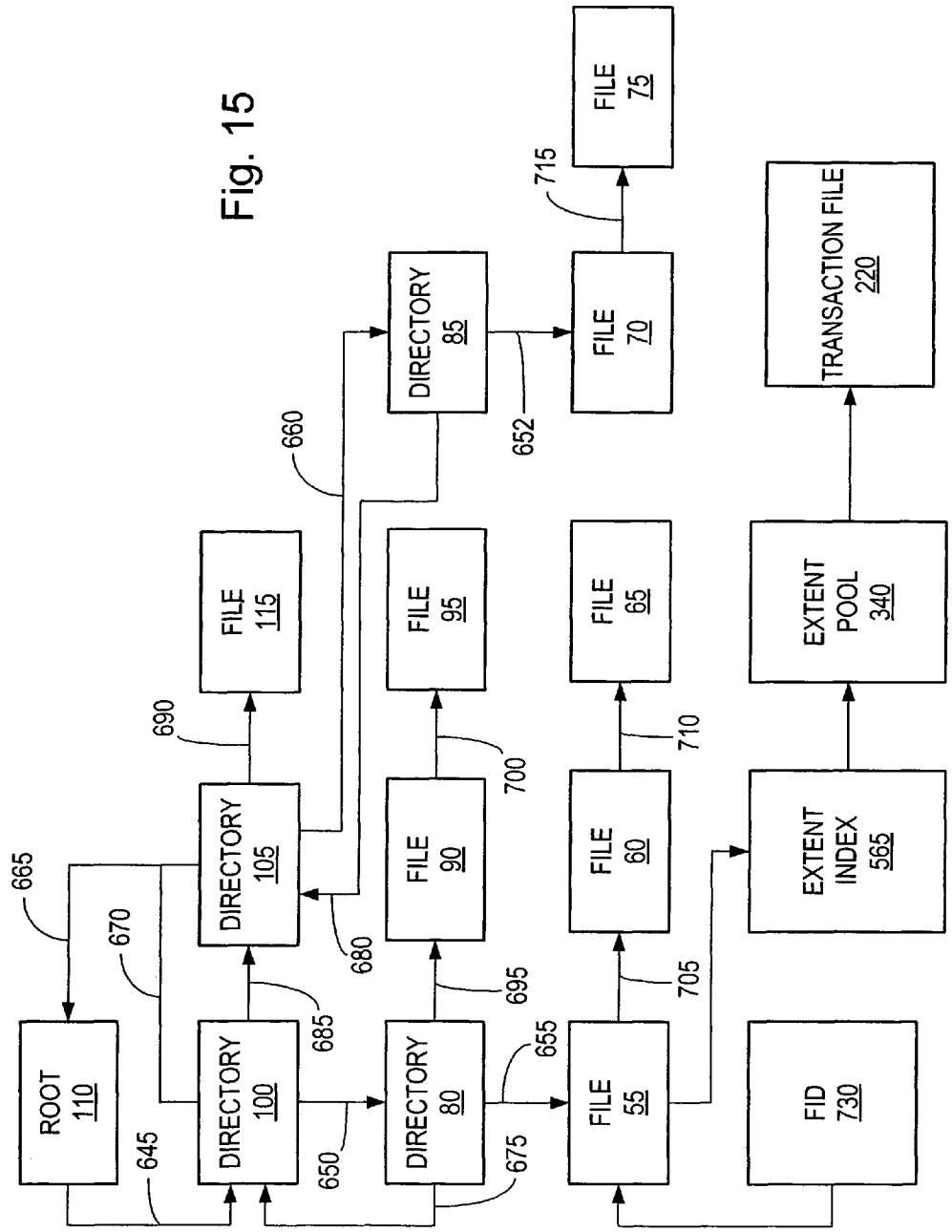

FILE SYSTEM HAVING DEFERRED VERIFICATION OF DATA INTEGRITY

BACKGROUND OF THE INVENTION

1. Technical Field

This invention is generally directed to a file system for use in a computer, embedded controller, or the like. More particularly, this invention is directed to a transaction based file system in which the integrity certain portions of the file system are verified during file system startup while the integrity of other portions of the file system are deferred.

2. Related Art

Computers, embedded controllers, and other microprocessor based systems are typically constructed from a variety of different hardware components. The hardware components may include a processor, I/O devices, human interface devices, etc. Additionally, such systems use memory storage units to maintain the data used in the system. The memory storage units may take on a variety of different forms including, but not limited to, hard disk drives, floppy disk drives, random access memory, flash memory, etc.

High-level application programs that are executed in such systems must often interact seamlessly with these hardware components, including the memory storage units. To this end, many systems run an operating system that acts as an interface between the application programs and the system hardware. File system software may be included as part of the operating system, or it may be provided as an ancillary software component that interacts with the operating system. In either instance, the file system software organizes the data within the memory storage units for ready access by the processor and the high-level application programs that the processor executes.

There are a number of different file system classifications since there are many ways to implement a file system. For example, a transaction based file system is one in which the file system is always maintained in a consistent state since all updates to the file system structure and the data are logged as transactions to a transaction file. More particularly, all updates to the file system are made as transactions within the transaction file, and the contents of the file system are dynamically re-constituted by successively applying all of the transactions that have been committed.

A transaction in the transaction file is either committed or it has not been completed. If the operation of the file system is interrupted, such as due to a power outage, for example, the state of the file system can be restored by consulting the contents of the transaction file. Any committed transactions are used by the file system, and any transactions that are not complete are rolled back, restoring the file system to the state it was in prior to the attempted update.

Restoration of the file system to a consistent state requires that the file system software execute a predetermined startup process. During a typical startup process, the integrity of each transaction stored in the transaction file is completely verified before it becomes part of the file system. Additional file system operations may also be executed during the startup process. The traditional manner in which transaction verification and other file system operations are performed after a file system interruption, however, is often sub-standard in that the operations are time, process and resource intensive.

SUMMARY

A computer system that is used in implementing a transaction based file system is disclosed. The computer system includes a processor, random access memory that is accessible by the processor, and a persistent data storage device that is likewise accessible by the processor. The computer system also includes file system software. The file system software is executed by the processor and operates to manage the file data and the file system structure of the files stored on the persistent data storage device. Additionally, the file system software maintains a transaction file that includes a plurality of transaction records. Each of the transaction records has a header section and a data section. The header section of each transaction record includes one or more fields that are designated to store information corresponding to a file transaction that is represented by the transaction record. If the operation of the file system software is interrupted, the file system software resumes its execution using a startup process in which a reconstructed file system is generated in the random access memory. During system restart, the startup process skips verification of the data section of a transaction record when the transaction record meets one or more predetermined criterion. Instead, verification of the data section is deferred until some time after the file system startup process has completed. For example, the file system software may verify previously unverified data sections of each transaction record representing a given file upon a first or subsequent access of the given file, provided that the file access occurs after completion of the file system startup process.

In one example, the file system startup process may make a distinction between transaction records merely affecting file data versus transaction records that affect the metadata of the file system. As transactions are found during the startup process, the file system software may identify whether a transaction impacts file data or metadata. Since only the metadata is required to ensure that the file system is in a consistent state after startup, the transaction records relating to metadata may be selected as the only subset of transaction records that are subject to complete verification. Verification of other transaction records may, for example, be limited to a check of the information contained in the header section of each remaining transaction record. Once the file system startup process has been completed, any previously unverified transaction records or transaction record portions may be verified upon a first or subsequent access of the corresponding file.

The transaction file may be stored, for example, in flash memory. In such instances, the startup process may be further enhanced. For example, the startup process may limit its header information verification to the first transaction record of a sequence of transaction records in the same block of the flash memory device. Neither the header nor data sections of the trailing transaction records of the sequence are verified during startup and the startup process moves on to processing the transaction records of the next device block, if any. Still further, the startup process may check the header section information to determine whether the memory locations in a device block have been erased or retired. If the memory locations in the device block have been erased or retired, start a processing continues with the next device block. Again, any previously unverified transaction records or transaction record portions may be verified upon a first or subsequent access of the corresponding file once the file system startup process has been completed.

In one implementation, the file system software may maintain a file verification indicator that designates whether or not the integrity of each transaction file record for a given file has been completely verified. This file verification indicator is checked by the file system software the first time (or a subsequent time) that a file is accessed after the file system startup process has been completed. If the indicator shows that the transaction records of the file have not been completely verified, a verification of the transaction file records for the file may be executed at that time. To expedite this verification process, verification may be limited to the transaction records and transaction record sections that were not previously verified during the file system startup process.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 15 is a logical representation of a reconstructed file system that has been generated in the manner set forth in connection with FIGS. 8 through 14 as applied to the exemplary file and directory arrangement shown in FIG. 2.

DETAILED DESCRIPTION OF THE PREFERRED EMBODIMENTS

Figure 1:
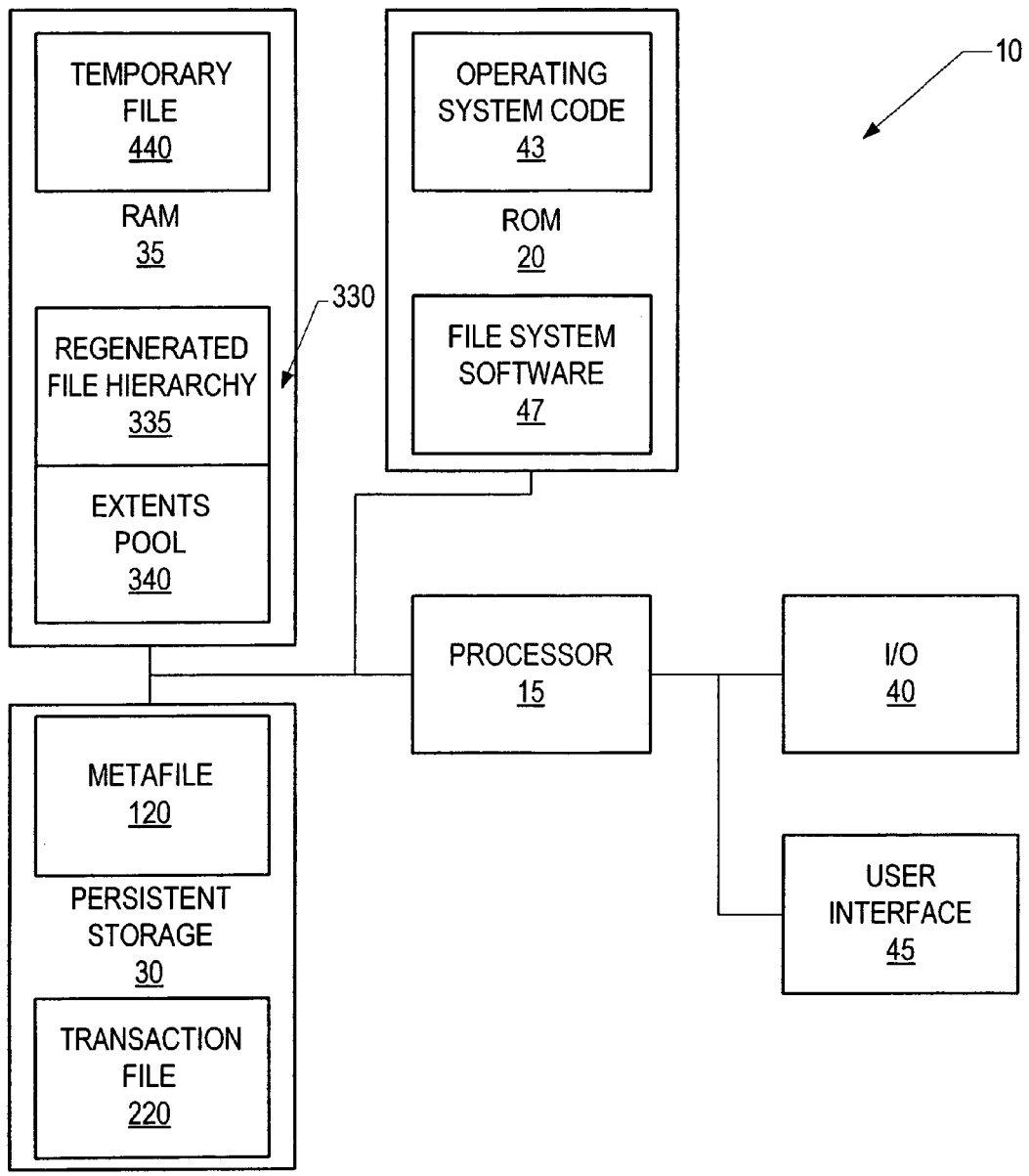
FIG. 1 is a block diagram of a computer system that may implement a transaction based file system in which startup verification of the file system integrity is optimized.

FIG. 1 illustrates the components that may be employed in an exemplary transaction based computer system 10. As shown, the exemplary system 10 includes a processor 15, read only memory 20, and a persistent storage unit 30. Computer system 10 may also include random access memory 35, an I/O interface 40, and a user interface 45. The specific components that are used in computer system 10 are tailored to the particular function(s) that are to be executed by the computer system 10. Accordingly, the presence or absence of a component, other than processor 15, may be specific to the design criterion imposed on the computer system 10. For example, user interface 45 may be omitted when the computer system 10 is to take the form of an embedded controller or the like.

Read only memory 20 may include operating system code 43 that controls the interaction between high-level application programs executed by the processor 15 and the various hardware components, including memory devices 20 and 35, the persistent storage unit 30, and the interface devices 40 and 45. The operating system code 43 may include file system software for organizing files stored on the persistent storage unit 30. Alternatively, the file system software may be provided as a separate software component that merely interacts with the operating system code 43. In the latter case, the code corresponding to the file system software may be stored in read only memory 20, persistent storage unit 30 or the like. When computer system 10 is networked with other computers and/or storage devices through I/O interface 40, the file system software may be stored remotely and downloaded to computer system 10 as needed. FIG. 1, however, illustrates storage of the file system software 47 in read only memory 20.

The persistent storage unit 30 may take on any number of different forms. For example, the persistent storage unit 30 may take the form of a hard disc drive, floppy disk drive, etc. It may also be in the form of a non-rotating media device, such as non-volatile memory implemented in an integrated circuit format (e.g., flash memory, etc.). Still further, persistent storage unit 30 need not be limited to a single memory structure. Rather, the persistent storage unit 30 may include a number of separate storage devices of the same type (e.g., all flash memory) and/or separate storage devices of different types (e.g., one or more flash memory units and one or more hard disk drives).

The files stored in the persistent storage unit 30 include data that is interpreted in accordance with a predetermined format used by an application program or by the operating system code 43. For example, the data stored within a file may constitute the software code of an executable program, the ASCII text of a database record, data corresponding to transactions executed (or not executed) by computer system 10, etc.

Figure 2:
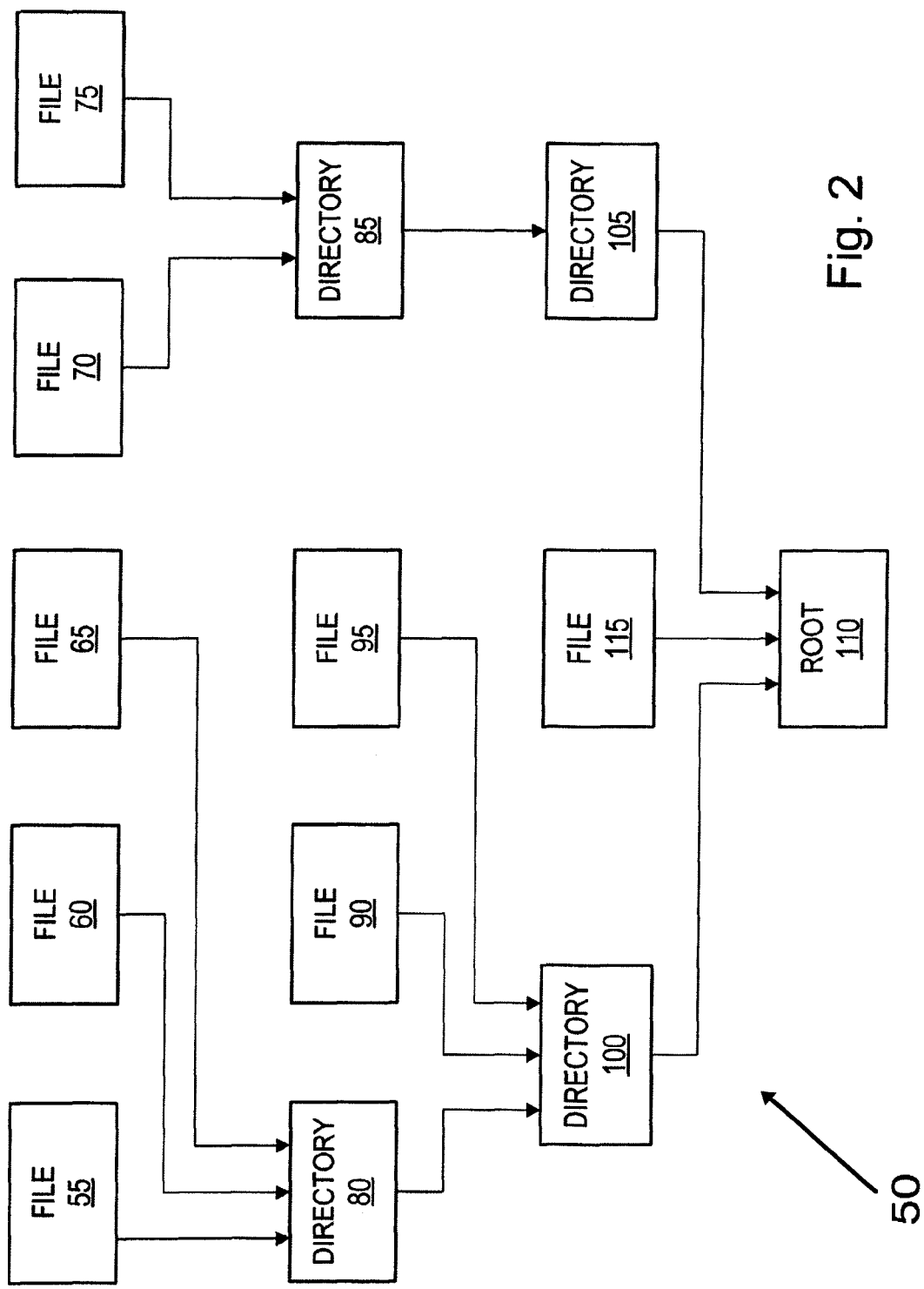
FIG. 2 is a tree diagram showing one example of an arrangement of files and directories that may be implemented in the transaction based file system.

In this exemplary system 10, the file system software 47 organizes the files stored on the persistent storage unit 30 using an inverted hierarchical structure. FIG. 2 is a diagram showing one manner in which the inverted hierarchical structure, shown generally at 50, may be implemented. In the traditional hierarchical structures used by many file systems, the top level of the file structure begins with the root directory and each directory points downward to the files and subdirectories contained within the directory. In the exemplary inverted hierarchical structure 50, however, the child files and child directories contained within a parent directory point upward to the parent directory. Depending on where the file system begins its organization, the root directory may constitute the lowest level of the file system structure.

The exemplary inverted hierarchical structure 50 includes five files 55, 60, 65, 70 and 75 at the highest level of the file system structure. Files 55, 60 and 65 are contained within directory 80 while files 70 and 75 are contained within directory 85. Accordingly, the file system software 47 organizes the file system so that the file system records representing child files 55, 60 and 65 point to the record for their parent directory 80. Similarly, file system records representing child files 70 and 75 point to the record for their parent directory 85.

At the next level of the exemplary inverted hierarchical structure 50, files 90 and 95 as well as directory 80 are contained within directory 100, while directory 85 is contained within directory 105. Accordingly, the file system software 47 organizes the file system so that file system records representing child directory 80 and child files 90 and 95 point to the record for their parent directory 100. Similarly, the file system record representing child directory 85 points to the record for its parent directory 105.

The root directory 110 may form the trunk of the inverted hierarchical structure 50. In this example, directories 100 and 105 and file 115 are contained within the root directory 110. Accordingly, the file system software 47 organizes the file system so that file system records representing child directories 100 and 105 and child file 115 point to the record for their parent directory 105.

Figure 3:
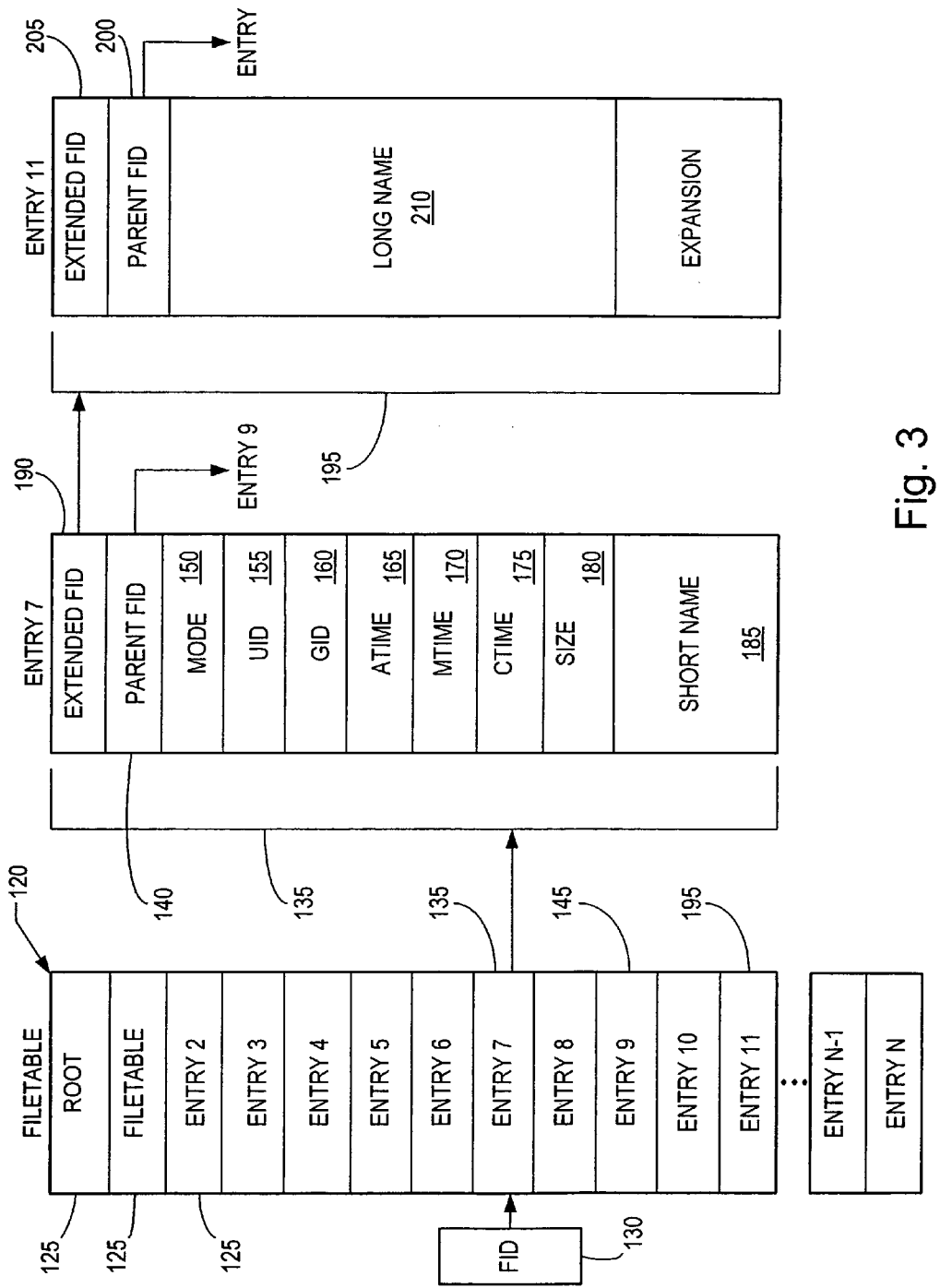
FIG. 3 is a block diagram illustrating one manner in which records of a metafile may be arranged to implement the file system structure shown in FIG. 2.

One manner in which the file system software 47 may organize the records of the file system to implement an inverted hierarchical structure is shown in FIG. 3. In this implementation of the file system, the file system software 47 generates one or more metafiles that include records corresponding to each file and directory used in the file system. FIG. 3 shows a single metafile 120 and an exemplary manner in which the records within the metafile 120 may be arranged and formatted. In this example, metafile 120 is arranged as a table that includes a plurality of equal length record entries 125. Each record entry 125 corresponds to a single file or directory used in the file system. A unique file identifier, such as the one shown at 130, is used by the file system software 47 to address a corresponding record 125 of the metafile 120. If each record entry 125 has the same record length, the format for the file identifier 130 may be chosen so that it may be used, either directly or indirectly, as an index to the desired record in metafile 120. For example, file identifier 130 may constitute an offset value that is used along with the memory address location of the first record of metafile 120 to calculate the memory address location of the first byte of the metafile record having the desired directory/file information.

In the example of FIG. 3, the file identifier 130 is pointing to record 135 (Entry 7) in metafile 120. Record 135 is shown in FIG. 3 in an expanded form adjacent to the metafile 120. The expanded form of record 135 also illustrates a basic record format that may be used for each record entry 125. In this example, record 135 includes a number of different fields containing information relating to the file or directory represented by the record. This information, among other things, corresponds to the logical location of the file or directory within the structure of the file system.

The inverted hierarchical structure of the file system may be implemented by employing a metafile record format in which each metafile record includes a pointer to the metafile record representing its parent directory. FIG. 3 shows a metafile record format in which each metafile record includes a parent identifier field 140 that stores the file identifier of its parent directory. In this example, the parent record identifier 140 of metafile record 13.5 corresponds to the file identifier used to address record 145 (Entry 9). Record 145, in turn, includes information pertaining to the directory containing the file or directory represented by record 135.

Each metafile record may also include other information pertaining to the directory or file that the record represents. In the exemplary record format of record 135, a number of different information fields are employed. The information fields include a mode field 150, user identification field 155, group identification field 160, access time field 165, modified time field 170, created time field 175, file size field 180 and short name field 185. The mode field 150 is used to determine whether the file or directory represented by the record is a system file/directory, a hidden file/directory, a read only file/directory, etc. The user identification field 155 and group identification field 160 contain information relating to user and group ownership of the represented file or directory. The access time field 165, modified time field 170, and created time field 175 contain information relating to the time at which the represented file or directory was last accessed, the time at which the represented file or directory was last modified and the time at which the represented file or directory was created, respectively. The size field 185 contains information on the size of the file represented by the record and is zero for directory records. Finally, the short name field 185 contains ASCII characters representing the short text name of the corresponding file or directory. The length of the short name field 185 may be chosen, for example, to conform to the POSIX standard. Additionally, each record may include hash values and/or name sums that correspond to the short name. Such hash values and/or name sums may be used by the file system software 47 to quickly search for a particular directory and/or file record.

Each record in metafile 120 may also include a field for an extended record identifier 190. The extended record identifier 190 may be used as a file identifier that points to an extended record in the metafile 120. The extended record may contain further information for the file or directory represented by the record and is particularly useful in instances in which all of the information pertaining to a particular file or directory does not fit within the memory space allocated for a single metafile record.

FIG. 3 illustrates one manner in which an extended record identifier 190 may be used. In this example, the extended record identifier 190 of record 135 corresponds to the file identifier (fid) used to access record 195 (Entry 11) in metafile 120. An exploded view of record 195 is shown adjacent the exploded view of record 135 in FIG. 3. This exploded view illustrates one record format that may be used for the extended record. As shown, each extended record may include its own parent identifier field 200. The parent identifier field 200 of an extended record, however, corresponds to the file identifier of the record that points to the extended record. In the example shown in FIG. 3, the contents of the parent identifier field 200 is used to point back to record 135 (Entry 7).

In those instances in which the memory space allocated for two record entries is insufficient to hold all of the information pertaining to a file or directory, the extended record 195 may point to yet a further extended record using its own extended record identifier, such as the one included in field 205 of record 195. Although the format for the further extended record pointed to by extended file identifier 125 is not shown, the further extended record may likewise include a parent record identifier that points back to record 195.

The type of information included in an extended record may vary between file systems. In FIG. 3, the extended record 195 includes a long name field 210 that contains ASCII characters corresponding to the text of the long name of the file or directory represented by the record 135. Further fields may be reserved in an expansion area 215 of each extended record, such as record 195, to store additional information relating to the corresponding file or directory.

In the foregoing example, the extended records used by the file system are stored in metafile 120. However, the extended records and any further extended records may alternatively be stored in a separate metafile, multiple metafiles, etc. The separate metafile(s) need not share the same storage medium with metafile 120 nor with each other. Rather, the metafiles may be stored in different storage media accessible to processor 15. Even the basic metafile records (directory and file records that do not have corresponding extended records) may be distributed among multiple files and/or multiple storage media. As such, although the metafile records of the exemplary system are stored in a single metafile, the metafile may alternatively be in the form of many individual files on the same or different storage media.

By organizing the files and directories of computer system 10 in an inverted hierarchical structure, it becomes possible to realize one or more file system advantages. For example, the file system is capable of being implemented in any manner in which typical file and directory transactions (i.e., moving a file/directory, deleting a file/directory, creating a file/directory, copying a file/directory) are accomplished atomically as a change, addition or deletion of a single metafile record. In such an implementation, for example, the file/directory represented by record 135 may be moved to another directory in the hierarchy merely by changing the parent identifier 140 so that it points to the metafile record for the new parent directory. This may be accomplished with a single write operation to record 135 in the metafile 120.

The foregoing inverted hierarchical structure may be employed to optimize a transactional or log-based system. An exemplary transactional or log-based system may be constructed from the components shown in FIG. 1. In this example, a transaction file 220 is maintained in the persistent storage unit 30 and is used to keep records of the transactions associated with each file and directory of the file system. Updates to the file system are committed atomically based on the transaction records contained in transaction file 220. In one of its simplest form, every transaction record may be stored as a single logical page that is mapped to a physical block or sector of the persistent storage unit 30.

Figure 4:
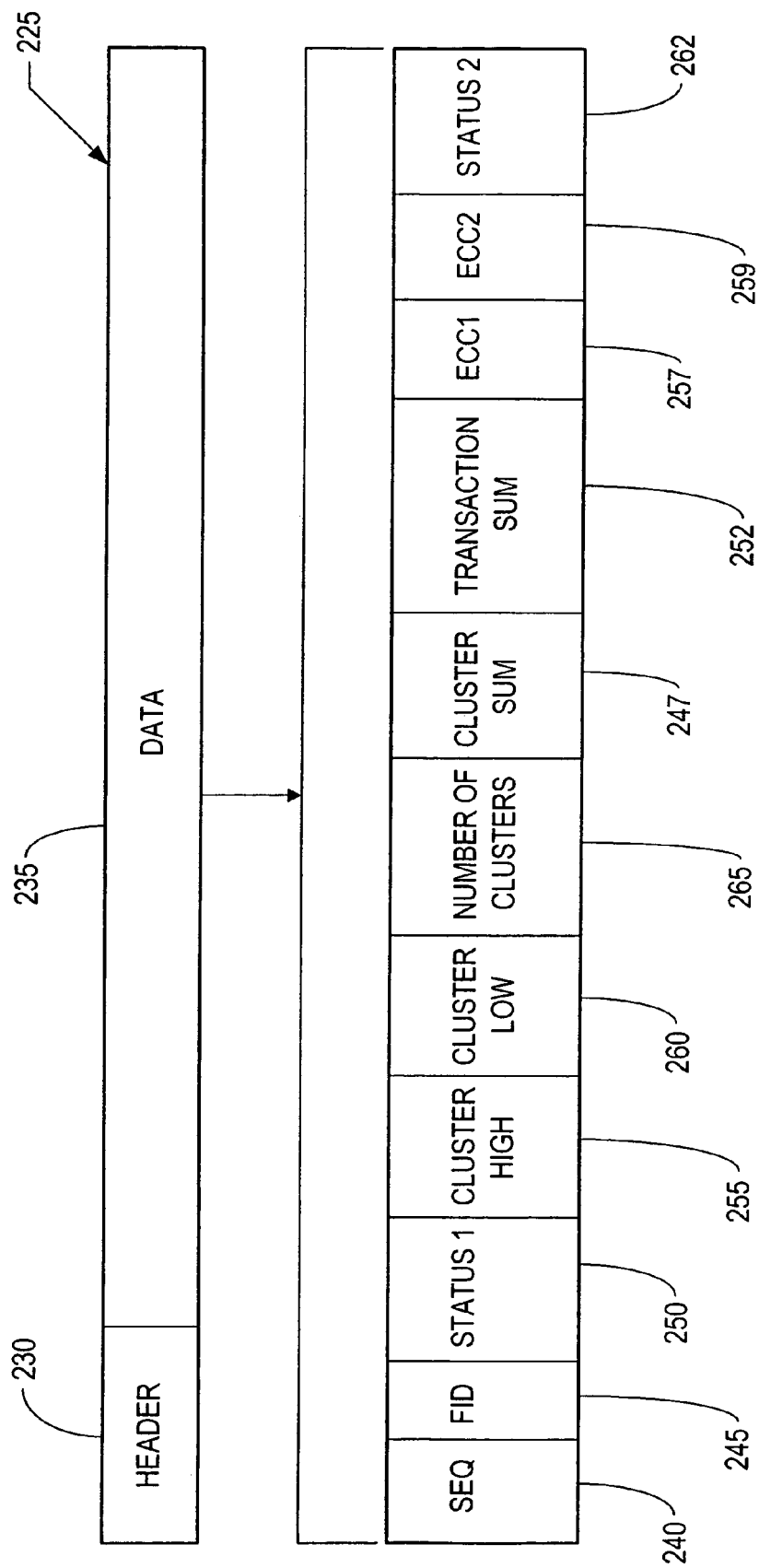
FIG. 4 illustrates one manner of logically arranging a transaction record in a transaction file of the transaction based file system.

One manner in which a transaction record 225 may be formatted for use in computer system 10 is shown in FIG. 4. Generally stated, each transaction record 225 of the transaction file 220 includes a header field 230 and a corresponding data field 230. The header field 230 may include a number of different sub-fields. The sub-fields shown in FIG. 4 include a transaction sequence field 240, a file identification field 245, a transaction status field 250, a cluster high field 255, a cluster low field 260 and number of clusters field 265. Additionally, further sub-fields may be included in header 230 to verify the integrity of the transaction and for error correction. These further sub-fields include a cluster sum field 247, a transaction sum field, an error correction code field 257 to check and correct header 230, an error correction code field 259 to check and correct data 235, and a further status field 262 indicative of the condition of the memory locations in which the transaction record is stored.

Each of the sub-fields of header field 230 has a meaning to the file system software 47. In this example, the transaction sequence field 240 is a monotonically increasing transaction identifier that is assigned by the file system software 47. When a new transaction record is added to the transaction file 220, the value stored in the transaction sequence field 240 of the new record may be increased by a predetermined amount over the value of the transaction sequence field of the chronologically preceding transaction record. Consequently, transaction records having larger transaction identifier values are considered to have been added to the transaction file 220 later in time than transaction records having lower transaction identifier values. This chronological sequencing of the transactions, as represented by the value of the transaction sequence field 240 (and, in certain circumstances, the position of the transaction record within a block of the transaction file 220), allows the file system software 47 to apply (i.e., commit) the transactions in the proper order to maintain the integrity of the file system contents. Other ways of keeping track of the chronological sequencing of the transactions may also be used.

File system software 47 uses the transaction status field 250 to determine whether the transaction of a transaction record 225 has been committed. Once a transaction has been committed, further alteration of the committed transaction record 225 may be inhibited by the file system software 47. This ensures consistency of the file system and also allows the file system to store the transaction file 220 in, for example, write-once media, flash media, or the like.

The file identification field 245 of header 230 identifies the file that is affected by the transaction record 225. The format for the file identification field 245 may be selected so that it is the same as the file identifiers used in the metafile records. The cluster high field 255 and cluster low field 260 are used by the file system software 47 to determine the starting address (or offset) at which the data 235 is to be written into the identified file while the number of clusters field 265 is used to determine how many clusters of the identified file are to be overwritten by the data 235.

As noted above, persistent storage unit 30 may include one or more flash memory devices. Flash memory devices store information in logic gates, called "memory cells," each of which typically stores one bit of information. More recent advances in flash memory technology have also enabled such devices to store more than 1 bit per cell, sometimes referred to as multi-level cell devices. Additionally, flash memory is non-volatile, which means that the contents of memory cells are not lost when power is withdrawn from the device.

Figure 5:
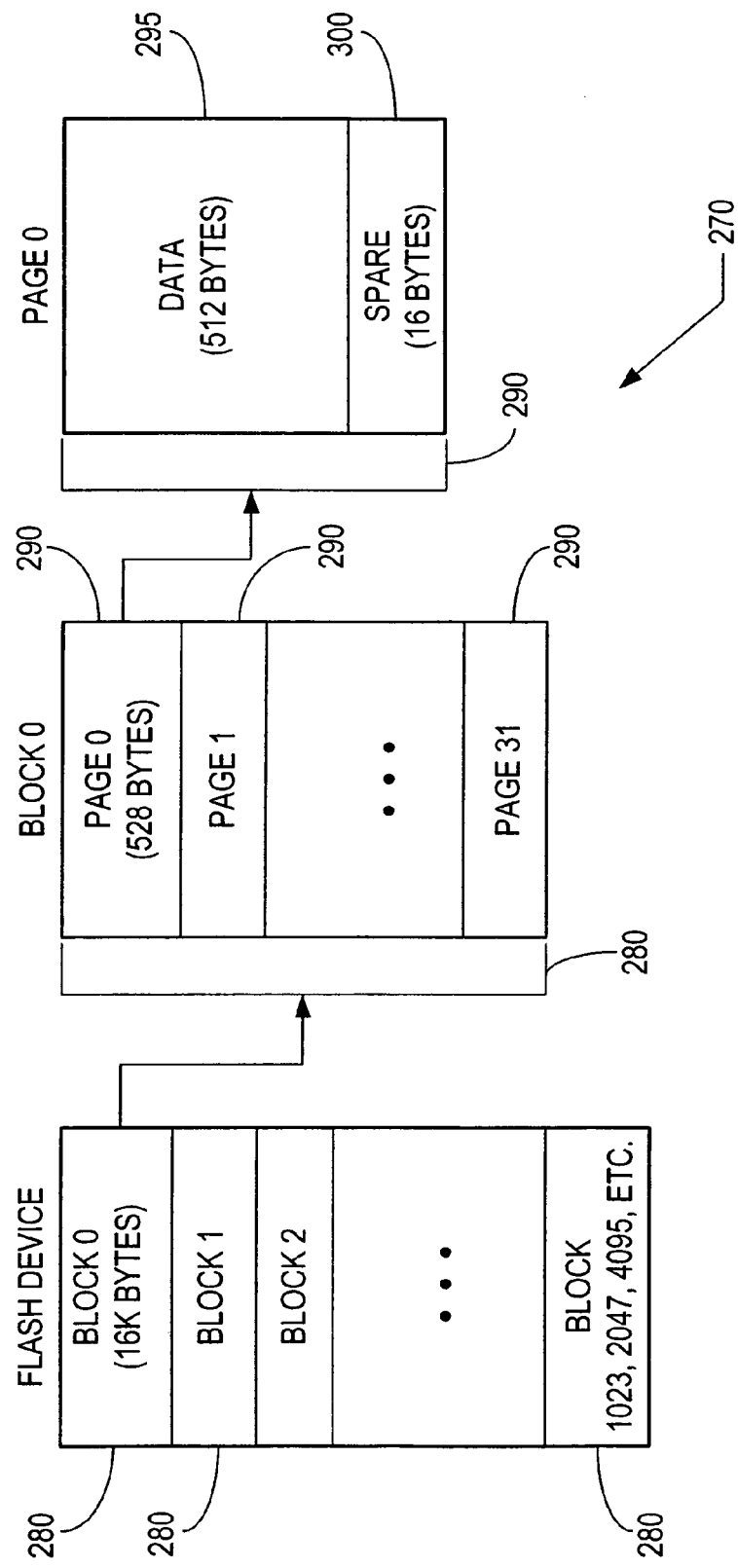
FIG. 5 shows the physical arrangement of memory in one type of flash media device.

Although flash device technology is continuously evolving, dominant technologies include NAND flash memory and NOR flash memory. NOR flash devices and NAND flash devices generally differ in the type of logic gate used for each storage cell. An exemplary logical architecture 270 of one type of NAND flash memory device 275 is shown in FIG. 5. As illustrated, the available memory on the device 275 is organized into contiguous physical blocks 280 each having an equal number of memory cells (i.e., 16K bytes). NAND flash memory device 275 further divides each of the contiguous blocks 280 into a specific number of physical sectors or pages 290. Each physical page 290, in turn, is further divided into a data area 295 and spare area 300. The data area 295 is normally reserved for storage of data, while the spare area 300 is typically reserved for maintenance of meta-information about the data stored in data area 295. The meta-information may include, for example, error-correcting codes used for verification and correction of sector contents, cyclic redundancy check data, etc.

NOR flash devices have an architecture similar to that shown in FIG. 5, except that the spare areas of each page are located on opposite sides of the data area. NOR flash devices also offer random access read and programming operations, allowing individual memory locations to be read on or read. However, once a memory location in a block has been written, NOR flash devices do not allow the block to be rewritten a smaller granularity than a block. Likewise, NOR flash devices do not allow erase operations at a smaller granularity than a block. insert quick mark saved document The data area 295 and spare area 300 are typically set to specific sizes in both NOR and NAND flash devices. For example, each page 290 of the exemplary NAND flash device 270 of FIG. 5 includes a data area 295 of 512 bytes and a spare area 300 of 16 bytes for a total page size of 528 bytes. The NAND flash device 275 also employs 32 pages 290 per block 280. Other page sizes may be used in computer system 10 and are commercially available. For example, many NAND devices include blocks having 64 pages where each page stores 2112 bytes so that the total data area per page is 2048 bytes and the spare area per page is 64 bytes.

Flash memory devices, such as NAND flash device 270, typically perform erase operations on an entire block 280 of memory at a time. An erase operation sets all bits within the block 280 to a consistent state, normally to a binary "1" value. Programming operations on an erased block 280 of flash device 270 can only change the contents of an entire page 290 (although NOR flash devices may be programmed in a slightly different manner). Once a page 290 of a NAND flash device is programmed, its state cannot be changed further until the entire block 280 is erased again. Reading of the contents of flash device 275 also occurs at the page level.

Figure 6:
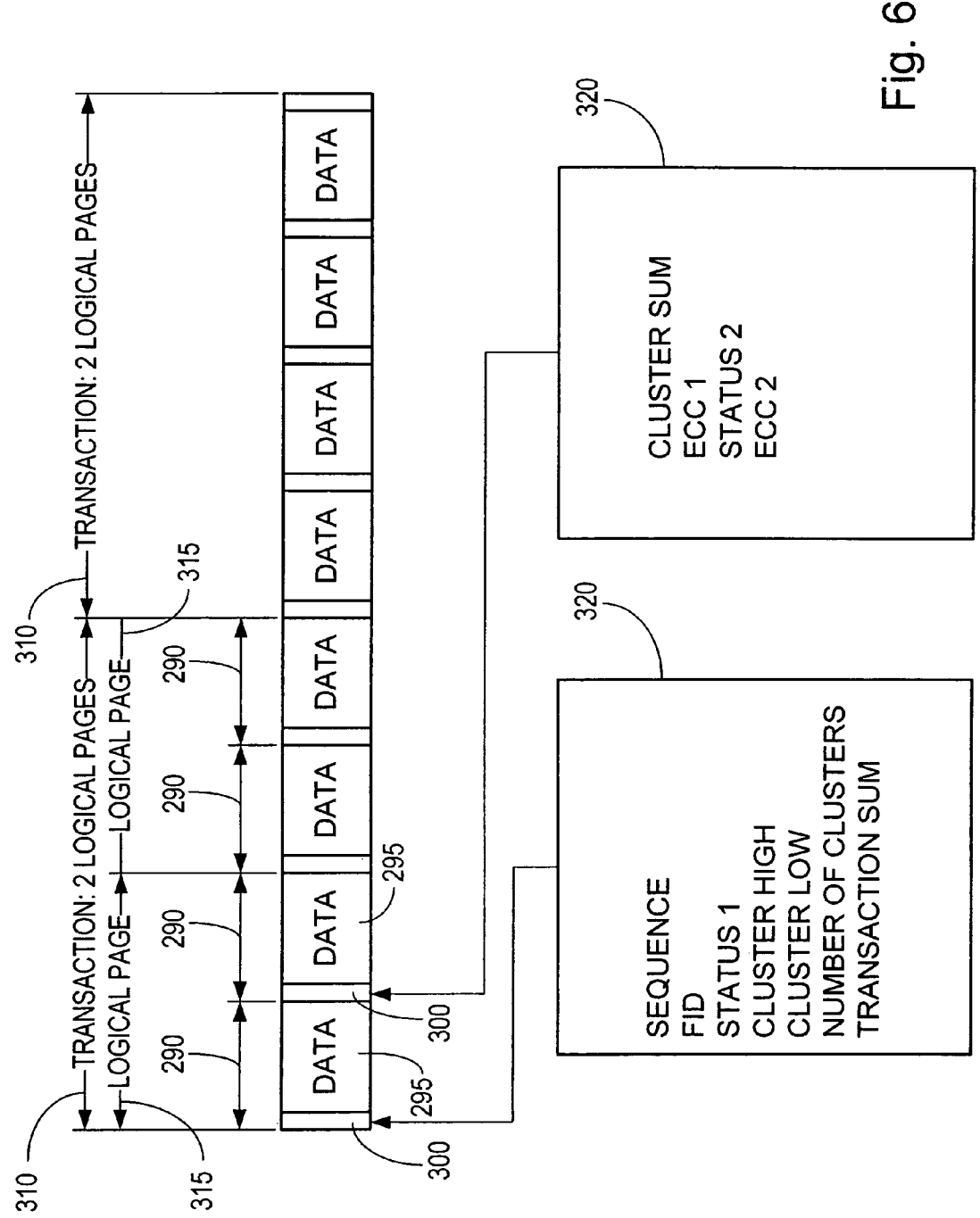
FIGS. 6 and 7 illustrate various manners in which transaction records may be arranged in flash media devices for use in the transaction based file system.

FIG. 6 illustrates one manner in which transaction records may be organized in a flash memory device, such as NAND flash device 270. In this example, each transaction record 310 is comprised of two or more contiguous logical pages 315. Each logical page 315, in turn, is comprised of two or more contiguous physical pages 290 of a block 280 of device 270. Meta-data information for the transaction record 310 is stored in spare area 300, and may include some of the fields described in connection with header 230 of FIG. 4. Depending on the size of the spare area 300 of each page 290, the meta-data information may be divided among multiple spare areas 300 of the transaction record 310. A division of the meta-data information between the spare areas 300 of two consecutive physical pages 290 is shown in FIG. 6. The transaction records shown in FIG. 6 may also be organized so that each transaction 310 corresponds to a single logical page 315 that, in turn, is comprised of, for example, two contiguous physical pages 290.

Figure 7:
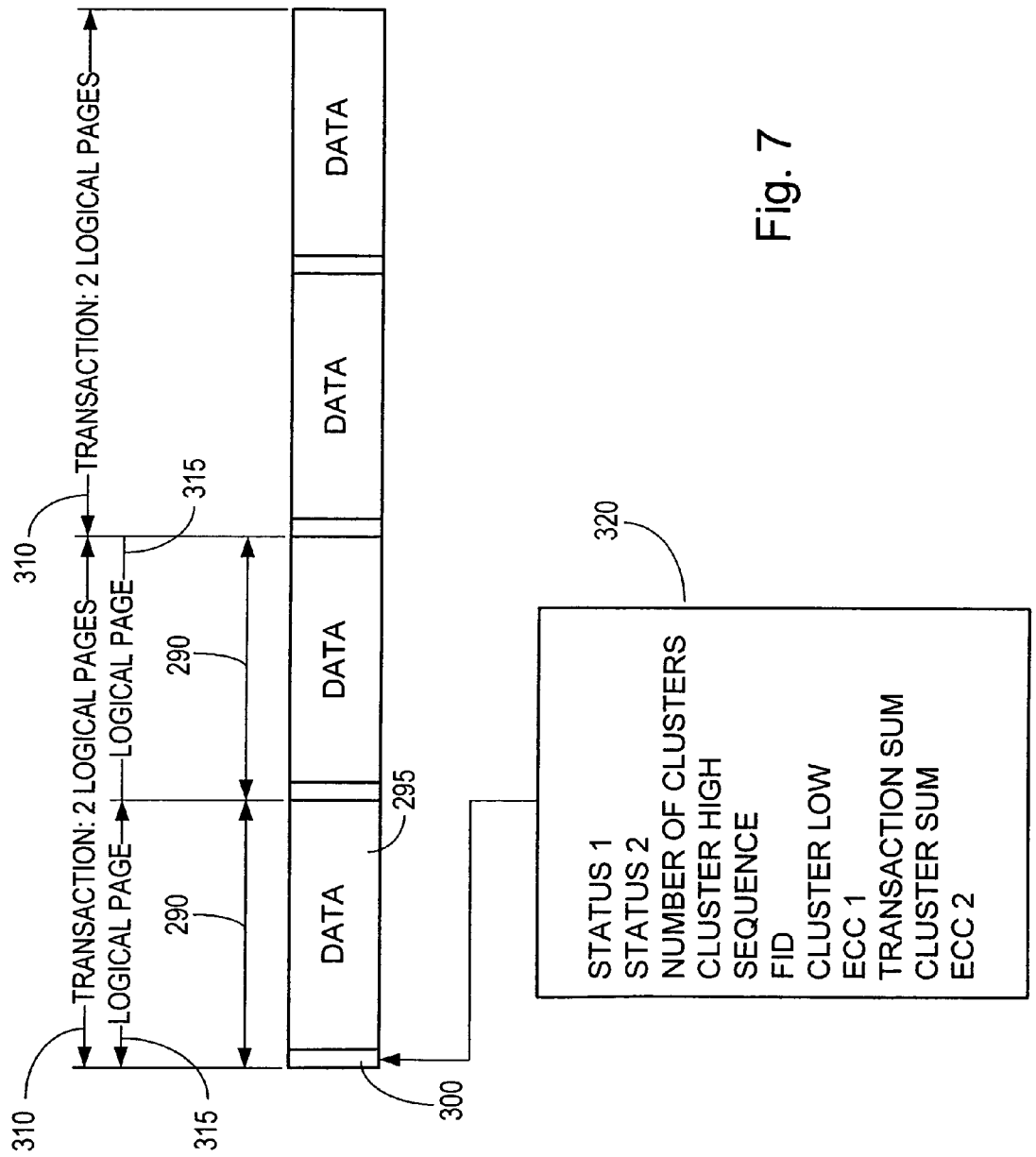

An alternative arrangement in which there is a one-to-one correspondence between each logical page 315 and a physical page 290 of flash device 270 is shown in FIG. 7. Another difference between this arrangement in the one shown in FIG. 6 is that all of the meta-data information 320 is stored in a single spare area 300 of the first physical page 290 of the transaction 310. Arrangements of this type are particularly suitable when large capacity flash devices are employed. However, the meta-data information 320 may also be divided between the spare areas 300 of the two contiguous physical pages 290 of the transaction record.

The sequence identifiers for the transaction records 310 stored in the same device block 290 may have the same values. In such instances, the sequence identifier provides chronological information that may be used to compare the time relationship between the transaction records of different device blocks. Chronological information on the transaction records 310 stored in the same block can be derived from the offset location of the transaction record 310 within the block 290, with later occurring transaction records 310 occurring at larger offsets.

After the computer system 10 has been started or powered on, the integrity of the file system may be verified by generating a reconstructed version of the file system in random access memory 35. The reconstructed file system, shown generally at 330 of FIG. 1, is generated using the valid, committed transactions stored in the transaction file 220 and from the file/directory information stored in metafile 120. In FIG. 1, the reconstructed file system 330 includes a regenerated file hierarchy 335 and an extents table 340.

Figure 8:
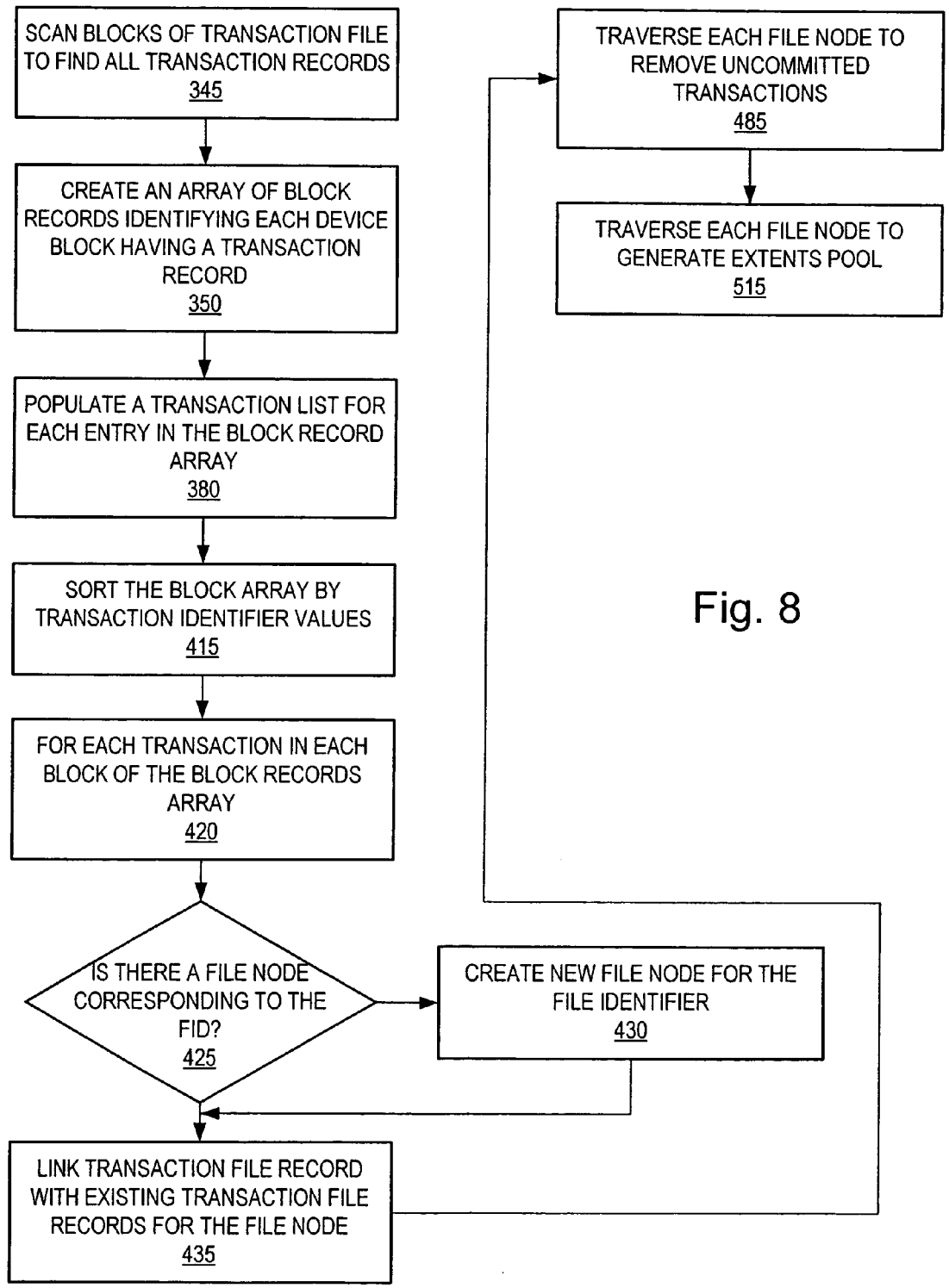
FIG. 8 illustrates a number of interrelated processing steps that may be used to generate an extents pool that, in turn, is employed in a reconstructed file system that is created by the computer system during startup.
Figure 9:
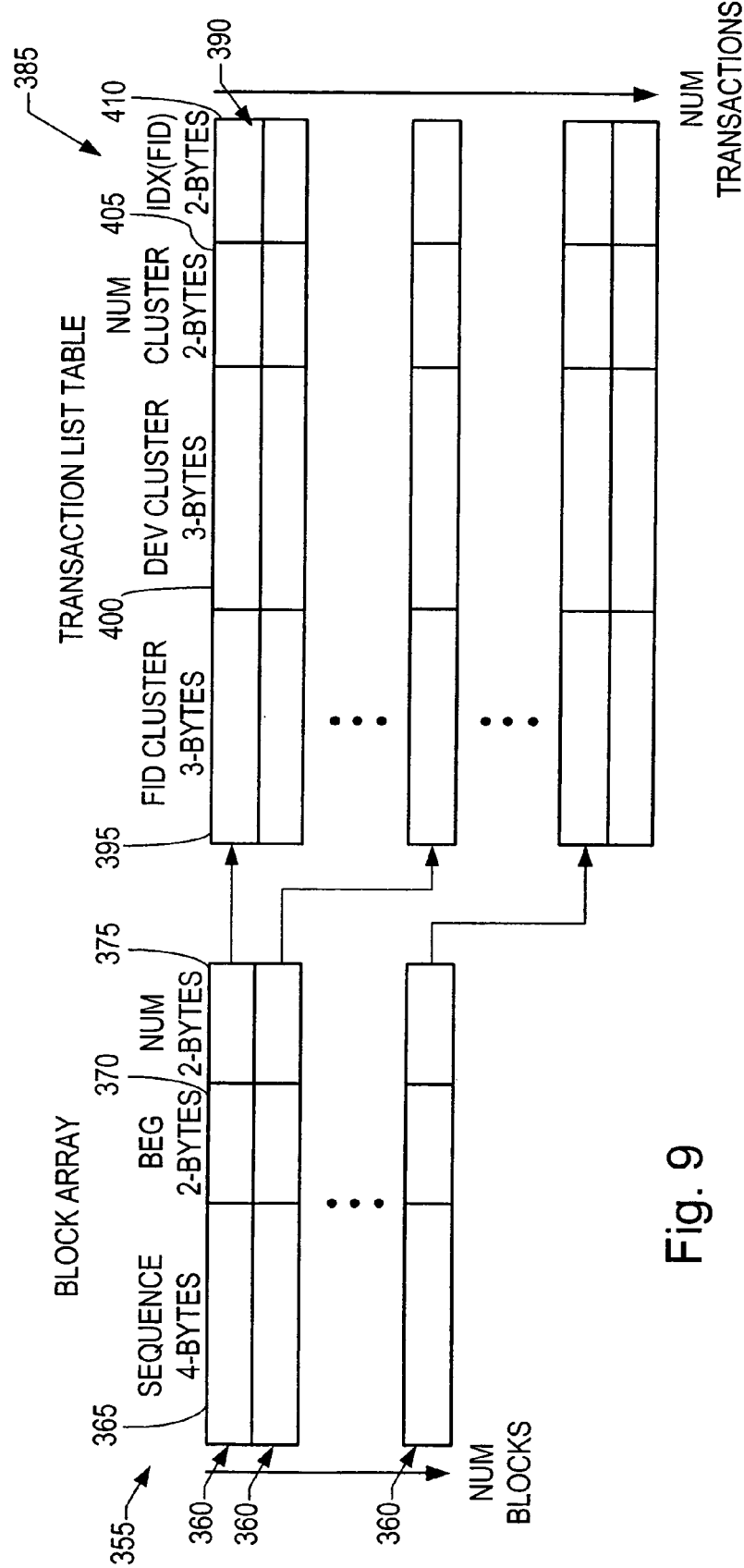
FIGS. 9 through 11 are directed to exemplary formats for various record types used in the processing steps shown in FIG. 8.
Figure 10:
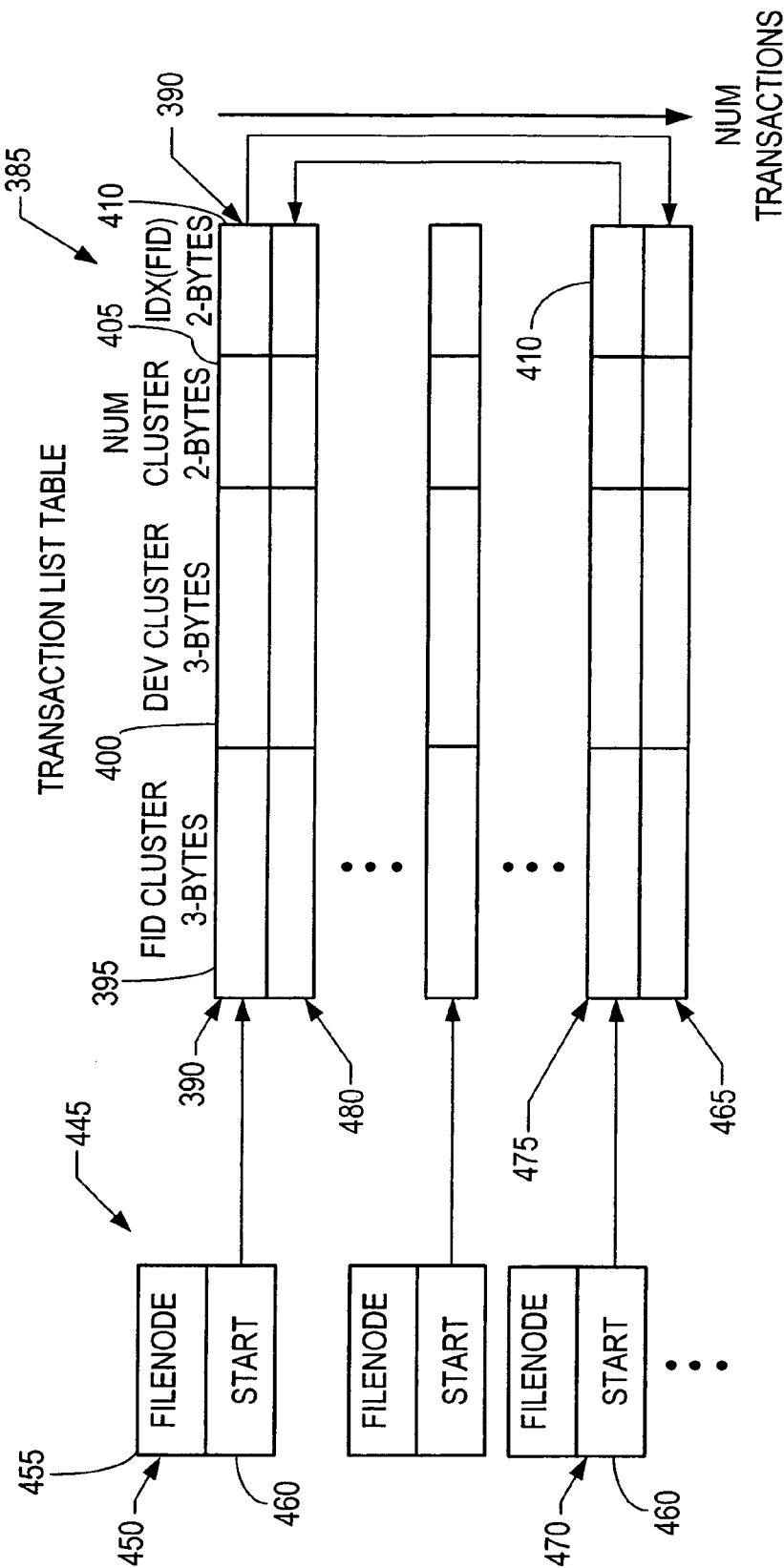
Figure 11:
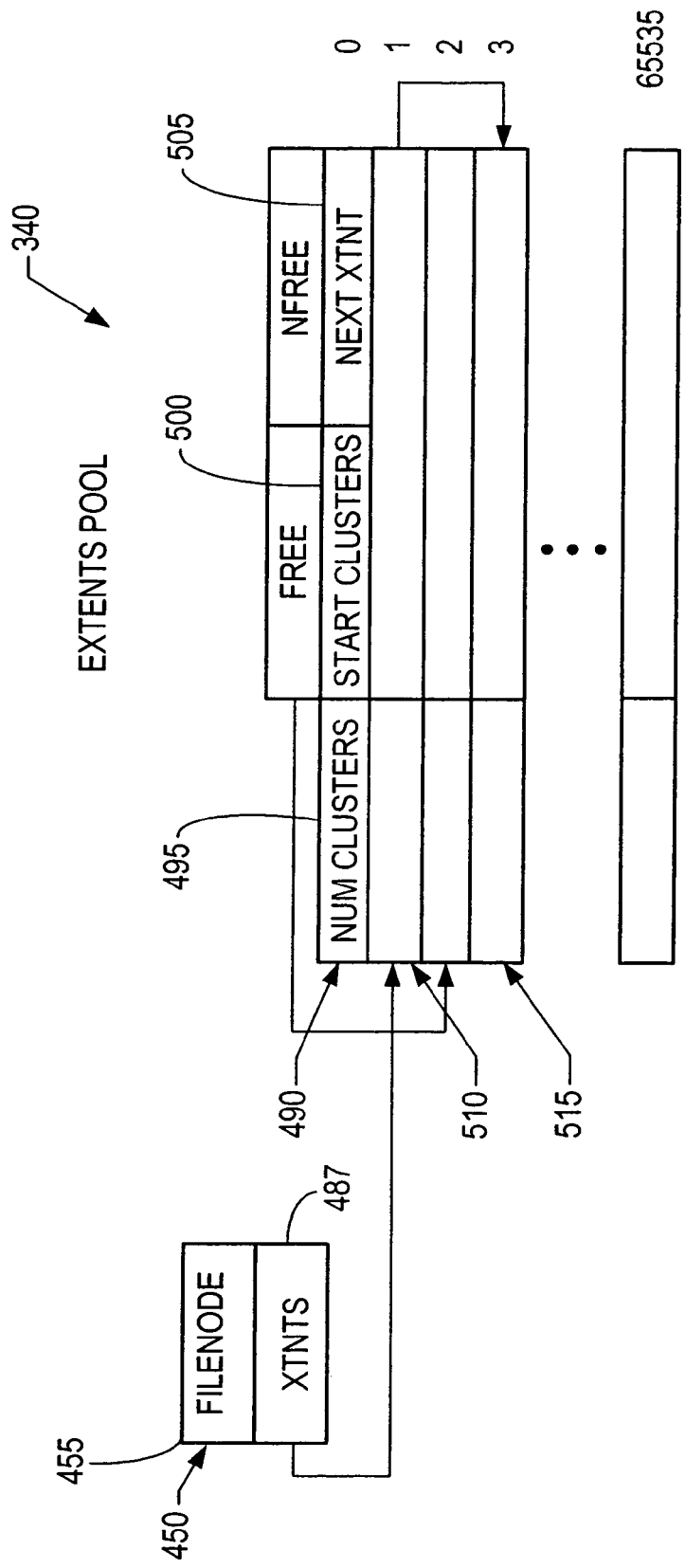

One manner of generating the extents table 340 is shown in FIGS. 8 through 11. FIG. 8 illustrates a number of interrelated processing steps that may be used to generate the extents pool 340 while FIGS. 9 through 11 illustrate the logical organization of various tables and arrays generated and used in these operations.

Generation of the extents table 340 may commence at step 345 of FIG. 8 by scanning the blocks of the transaction file 220 to find all of the transaction records. The blocks may be scanned in sequence from the lowest ordered block to the highest ordered block in which a committed transaction record is found. As transactions are found within the blocks, an array of block records identifying each device block having a transaction record is generated at step 350.

As the file system software 47 scans the blocks of the transaction file 220 for transactions, the file system software may encounter a block that has been erased as a result of transactions that have been retired, or because the blocks have not yet been assigned for use in the file system. The transaction header may be structured so that there are no valid transactions that will have all of the bits of the header set to the erased value, typically a binary "1". As the file system software 47 scans the blocks of the transaction file 220, any transaction in which the header indicates an erased block may be skipped. This header invariant may be enforced by using a single bit as a flag to indicate the transaction is in use by the file system when it is the inverse of the erase value. Upon finding such an erase signature value in a transaction header, scanning of the remaining pages in the block is skipped thereby saving the time that would otherwise be used to access the erased pages. The overall system startup time is correspondingly decreased.

The organization of an exemplary block array 355 is shown in FIG. 9. Each block array record 360 includes a sequence field 365, a begin transaction field 370 and a number of transactions field 375. The sequence field 365 may be used to store the transaction identifier value for the transaction records stored in the block. The begin transaction field 370 may be used to store an index to the first transaction in the block and the number of transactions field 375 may be used to store the number of transactions found in the block.

At step 380 of FIG. 8, the file system software 47 populates a transaction list table for each record entry in the block array 355. FIG. 9 illustrates one manner in which the transaction list table 385 may be organized. In this example, each record 360 of the block array 355 points to at least one transaction list record 390 of the transaction list table 385. More particularly, a transaction list record 390 is generated for each transaction found in the block represented by a given block array record 360. The value stored in the number of transactions field 375 of the given block array record 360 corresponds to the number of transactions in the given block and designates how many records 390 for the given block will be added to transaction list table 385.

Each transaction list record 390 of the transaction list table 385 may have the same record length and include the same record fields. The exemplary fields used in records 390 of FIG. 9 include a file cluster offset field 395, a device cluster index field 400, a number of clusters field 405 and a file identifier/idx field 410. The file cluster offset field 395 may be used to identify the physical location of the transaction within the block. The device cluster index field 400 may be used to identify where the data for the transaction begins. The number of clusters field 405 may be used to identify how many clusters of data are present within the transaction. Finally, the file identifier/idx field 410, as will be set forth below, is multipurpose. Initially, however, the value stored in the file identifier/ idx field 410 is used to identify the file to which the transaction applies. The file identifier value stored in field 410 may directly correspond to the file identifier used to reference the record in metafile 120. Upon the completion of step 380, the records 360 of block array 355 will be arranged, for example, in increasing block order, while the records 390 for each block array record 360 will be arranged in increasing page order.

At step 415, the records 360 of block array 355 are sorted based on the values stored in the sequence fields 365. This operation is performed to place the records 390 of the transaction list table 385 in chronological order (i.e., the order in which the corresponding transactions are to be applied to the files of the file system).

A temporary file 440 storing file node information corresponding to the transaction records of the file system may then be generated in RAM 35 using the sorted records of block array 355 and transaction list table 385. To this end, a basic record corresponding to the root directory of the file system is first added to temporary file 440. The information used to generate the root directory node in temporary file 440 may be obtained from the record corresponding to the root directory file stored in metafile 120.

A logical representation of one manner of arranging the file node records in temporary file 440 is shown generally at 445 of FIG. 10. In this example, each file node record 450 includes a file node field 455 and a start field 460. The contents of the file node field 455 is used to identify the file node to which various transaction records 390 of the transaction list table 385 are linked. For the sake of simplicity, the contents of the file node field 455 may have the same format as the file identifiers used to access the corresponding record entries 125 of metafile 120. The contents of the start field 460 may be used to identify the location of the first transaction record 390 in transaction list table 385 that corresponds to the file identified in the file node field 455. As such, each file node record 450 identifies a file within the file system as well as the location of the first transaction relating to the identified file.

At step 420, each of the sorted records 360 and 390 of the block array 355 and transaction list table 385 are traversed to determine whether or not the temporary file 440 includes a file node record 450 corresponding to the file identifier stored in file identifier/idx field 410. If a file node record 450 with the same file identifier as the transaction record 390 is not found in the temporary file 440, a new file node record 450 is created at step 430. Once a file node record 450 corresponding to the transaction list record 390 exists in temporary file 440, the transaction list record 390 may be linked into a list of transactions for the file node record 450. In this example, the transaction list record 390 is linked into the list of transactions for the file node record 450 at step 435 of FIG. 8. The manner in which a transaction list record 390 is linked into the list of transactions for the file node may depend on whether the transaction list record 390 is the first transaction list record of the file node or a subsequent transaction list record for the file node. If it is the first transaction list record of the file node, the start field 460 of the file node record 450 is updated to identify the starting location of this first transaction list record 390. As such, the contents of the start field 460 of the file node record 450 may be used to point to a location in the transaction list table 385 that, in turn, contains extent information for the first transaction applied to the file. The function of the file identifier/idx field 410 changes when the transaction list record 390 is to be appended to existing transaction list records for the file node (i.e., when it is not the first transaction list record for the file node). More particularly, the value and the function of the field 410 is changed so that it points to the last transaction record 390 associated with the file node. This is illustrated in FIG. 10, where the start field 460 of file node record 450 points to the beginning of transaction list record 390. The file identifier/idx field 410 of record 390, in turn, points to the beginning of transaction list record 465, which contains the information on the location of the second transaction for the file represented by the file node record 450. Similarly, the start field 460 of file node record 470 points to the beginning of transaction list record 475. The file identifier/idx field 410 of transaction list record 475 points to the beginning of transaction list record 480, which contains the information on the location of the second transaction for the file represented by the file node record 470.

Once all of the transaction list records of the transaction list table 385 have been linked in the proper manner with the corresponding file node records, the transaction list records for each file node are traversed at step 485 to remove any transaction list records that reference uncommitted and/or bad file transactions. Removal of such transaction list records may be accomplished in a variety of different manners. For example, the file system software 47 may check the status field of the last occurring transaction to determine whether or not it was committed. If the transaction has been committed, the corresponding record in the transaction list table 385 is left undisturbed. If the transaction has not been committed, however, the corresponding record in the transaction list table 385 is removed or otherwise ignored.

To expedite this type of transaction commitment checking, the file system software 47 only needs to ensure that the last occurring transaction has been committed. Commitment checking of all other records may be skipped since only the last occurring transaction is impacted by a power failure, improper system shutdown, or the like. By skipping commitment checking of all other records, the time required for system startup may be substantially reduced.

Although it is shown as part of a linear sequence, step 485 may be executed as each transaction list record is processed for incorporation in the corresponding file node. For example, file system software 47 may check the status information included in the header of each transaction record to determine whether the transaction has been committed. This check may occur as each transaction record is used to populate the corresponding transaction list record. Once the file system software 47 finds a transaction that has not been committed, no further processing of the transaction list table 385 in steps 420 through 485 of FIG. 8 is necessary.

At step 490, entries are generated in extents pool 340 for each of the file nodes. One manner in which this may be accomplished is shown in FIG. 11. In this example, the content of the start field 460 of each file node may be changed so that it now operates as an extents index field 487. The extents index field 487 points to the first location in the extents pool 340 containing information on the location of the transaction data for the first transaction for the file. Each extents record 490 may include a number of clusters field 495, a start cluster field 500, and a next extent field 505. The start cluster field 500 identifies the starting location in device 270 where the first file transaction for the file corresponding to the file node is stored. The number of clusters field 495 identifies how many contiguous clusters of device 270 are used to store the file transaction. The next extents field 505 identifies the extents index of the next extents record for the file represented by the file node. In this example, extents index 487 points to extents record 510 while the next extents field 505 of extents record 510 points to extents record 515.

The data used to populate the records of the extents pool 340 may be derived, at least in part, from the data stored in the transaction list table 385. In the example shown here, the extents pool 340 is a more compact form of the transaction list table 385. To this end, file system software 47 may combine transaction list records having contiguous data into a single extents record entry if the transaction list records are part of the same file node. Similarly, there is no further need to maintain the block array 355 in RAM 35. Therefore, block array 355 may be discarded from RAM 35.

The integrity of the transactions in the transaction file 220 may be checked during the execution of the various steps used to generate extents pool 340. For example, integrity checking of the transaction records may be executed during either steps 350 or 380 of FIG. 8. Common data checks include CRC and ECC techniques.

To decrease the startup time of the computer system 10, error checking techniques may be limited to the information included in the header for certain transactions. As transactions are found during the startup process shown in FIG. 8, the file system software 47 may identify whether the transaction impacts file data or metadata, such as directory structure information in metafile 120. This distinction may be based on the file identifier associated with the transaction. Normally, metadata will be represented by file identifiers that are well-known and hard coded into the file system software 47 (e.g., they will identify the metafile 120 as the file that is the subject of the transaction). Since only the metadata is required to ensure that the files system is in a consistent state after startup, data checking techniques on the data portion of the transaction are only performed when the transaction relates to such metadata. If the transaction does not relate to a change of the metadata, data checking techniques may be initially limited solely to the checking of the header information. In the transaction record format shown in FIG. 6, the principal header information that must be verified on system startup is stored in the first spare area 300 of each transaction record 310. This allows the file system software 47 to skip verification of the header information included in the second spare area of each transaction record 310 thereby further optimizing the startup sequence. As will be explained in further detail below, error checking of the data portion of each transaction may be deferred until the time that the corresponding file is first accessed by the file system software 47 after completion of the startup sequence.

Any startup verification of the transaction records may be further optimized by limiting error checking solely to the first transaction header of a series of sequential transactions. During startup scanning of the transaction file 220, when a transaction header is found that indicates that a number of sequential transaction records for the same file follow, verification of the headers of the trailing transactions in the sequence may be skipped once the header for the first transaction record of the sequence has been verified. Scanning and verification of header information may then resume with the next block following the last of the trailing transactions.

Figure 12:
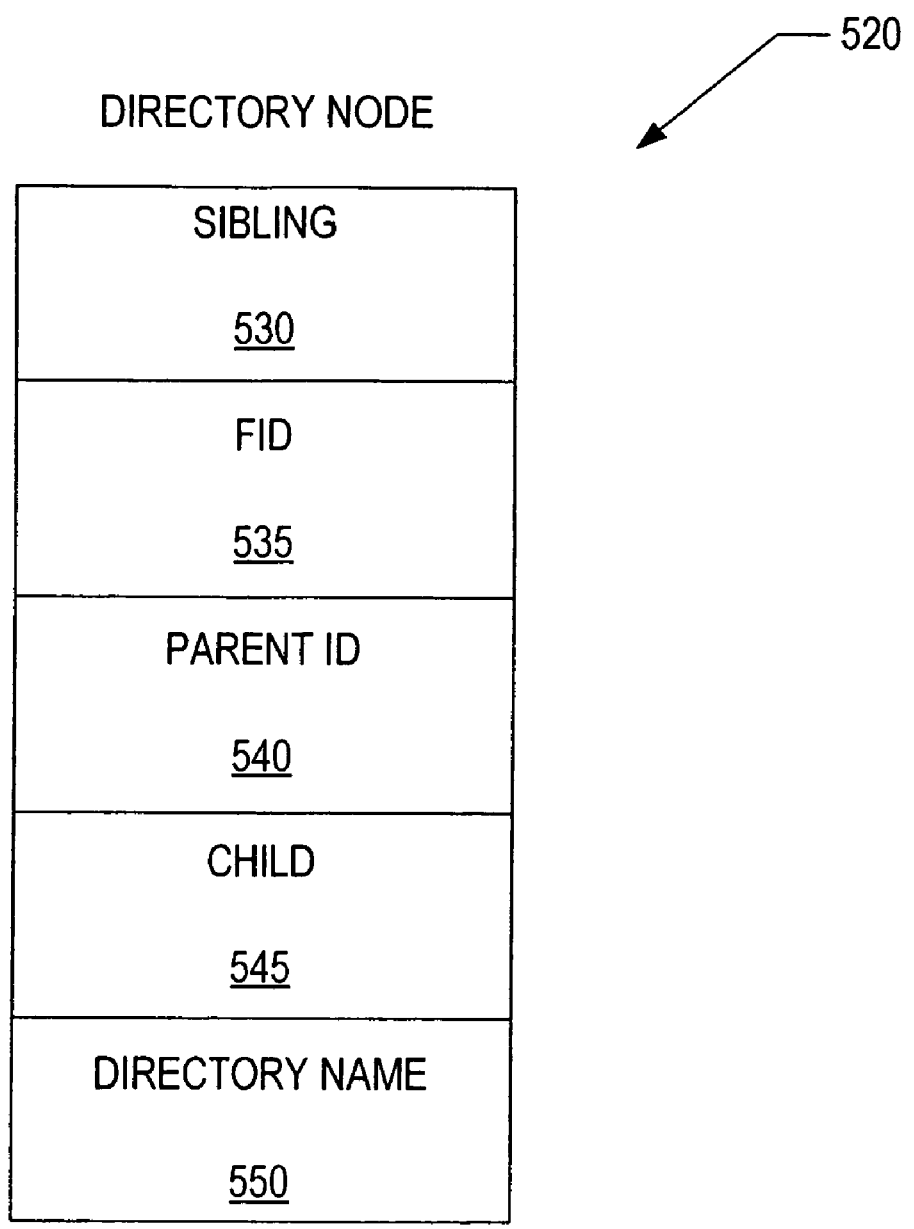
FIG. 12 is directed to an exemplary format for a directory node record of the regenerated file hierarchy used in the reconstructed file system.
Figure 13:
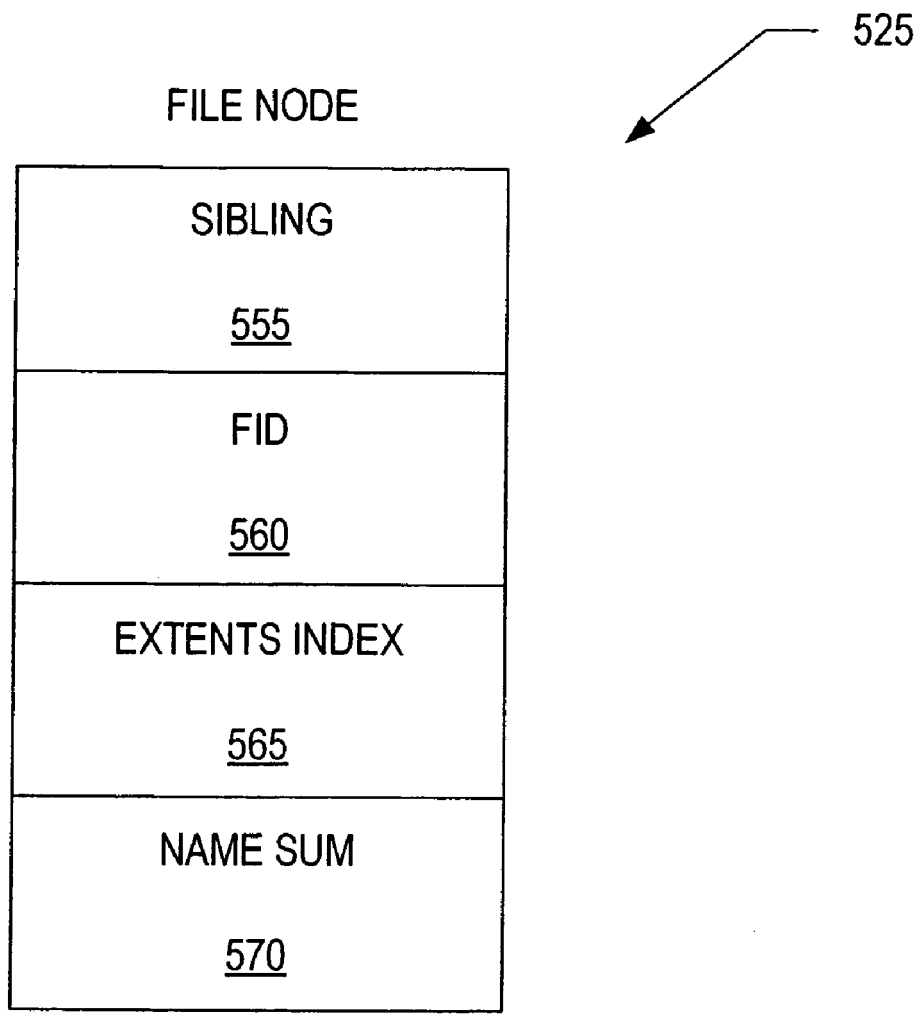
FIG. 13 is directed to an exemplary format for a file node record of the regenerated file hierarchy used in the reconstructed file system.

The next broad step in generating the reconstructed file system 330 in RAM 35 is the construction of the regenerated file hierarchy 335. In this example, the regenerated file hierarchy 335 is comprised of both file and directory node records. An exemplary format for a directory node record is shown generally at 520 of FIG. 12 while a corresponding exemplary format for a file node record is shown generally at 525 of FIG. 13.

Directory node record 520 includes a number of different fields that are used by the file system software 47. More particularly, directory node record 520 may include a sibling field 530, a file identifier field 535, a parent identifier field 540, a child field 545 and a directory named field 550. Similarly, file node record of FIG. 13 includes a number of different fields that are used by the file system software 47. The file node record fields may include a sibling field 555, a file identifier field 560, an extents index field 565 and a name sum field 570.

Since the data contained in the records of metafile 120 is used in the construction of the regenerated file hierarchy 335, the manner in which the metafile records are arranged in the metafile 120 will have an impact on the system startup performance. To this end, the records of metafile 120 are arranged in a single metafile as contiguous records having the same length and are all stored in the same storage media. This arrangement enhances the speed with which the file system software 47 may access the metafile data and reduces the amount of processing that is required for such access.

Figure 14:
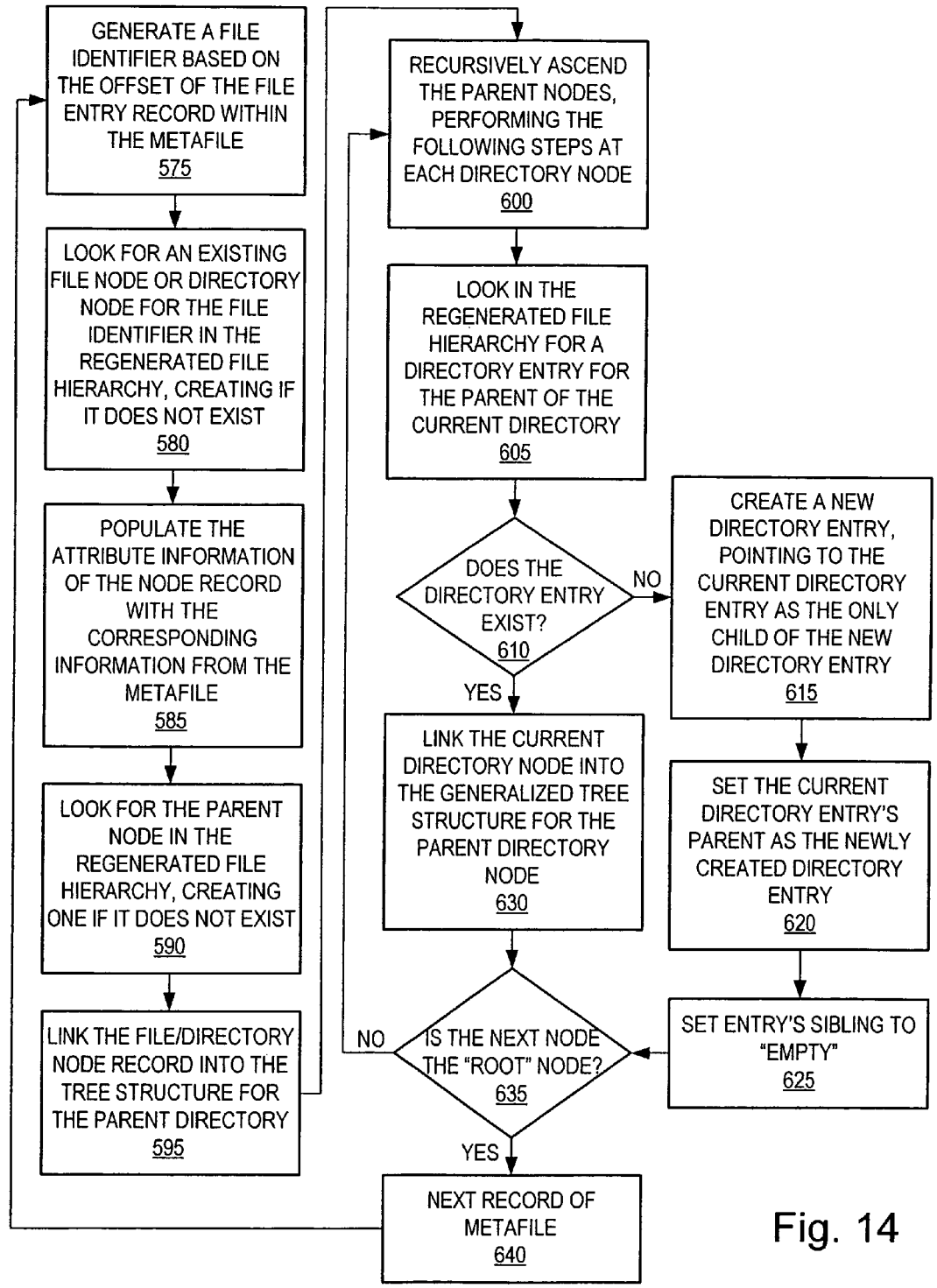
FIG. 14 illustrates a number of interrelated processing steps that may be used to construct the regenerated file hierarchy used in the reconstructed file system.

One sequence of steps that may be used to populate the fields for each file node record 525 and directory node record 520 of the regenerated file hierarchy 335 is shown in FIG. 14. The illustrated sequence is executed for each record in metafile 120 and may start at step 575. At step 575, a file identifier is generated based on the offset of the first record entry within the metafile 120. A check of the regenerated file hierarchy 335 is made at step 580 to determine whether a file node record 525 or directory node record 520 corresponding to the file identifier is already present. If a corresponding record 520 or 525 is not present, a new record file is created in the regenerated file hierarchy 335. The format of the newly created record depends on whether the file identifier corresponds to a file entry or directory entry in metafile 120. The file system software 47 will make this determination and apply the proper record format 520 or 525.

At step 585, the fields for the newly created record are populated using the attributes for the file/directory that are found in the metafile 120. If the newly created record corresponds to a directory node, the parent identifier field 540 and directory name field 550 are populated using the data in the parent file identifier and short name fields of the corresponding record in metafile 120. If the newly created record corresponds to a file node, the name sum field 570 may be populated using data that is directly stored or derived from the file name data of the corresponding record in metafile 120. The extents index field 565 is populated using the data found in the extents index field 487 of the corresponding file node record 450 (see FIG. 11).

If the newly created file corresponds to a directory node, a search through the regenerated file hierarchy 335 is undertaken at step 590 to determine whether the parent node exists. If the parent node does not exist, a directory record corresponding to the parent node is added to the regenerated file hierarchy 335.

At step 595, the newly generated file/directory record is linked into the tree structure for the parent directory node. If the child field 545 of the newly generated file/directory record indicates that the parent directory has no children, the value of the child field 545 of the parent directory record is reset to point to the newly generated file/directory record and the sibling field 555 or 530 of the newly generated file/directory record is set to indicate that the newly generated file/directory record does not have any siblings. If the child field 545 of the parent node record indicates that the parent directory node has children, the sibling field 565 or 530 of the newly generated file/directory record is set to point to the existing child of the parent directory and the child field 545 of the parent directory is set to point to the newly generated file/directory record. If the newly generated file/directory record corresponds to a directory node, the parent identifier field 540 of the newly generated directory record is set to point to the parent directory node.

At step 600, the file system software 47 recursively ascends the parent nodes, beginning with the parent directory of the newly generated file/directory record, and executes a series of processing steps until the root node is reached. At this point, the parent directory node of the newly generated file/directory record may be referred to as the current directory node. In the exemplary process shown in FIG. 14, the file system software 47 checks the regenerated file hierarchy 335 to determine whether a directory node record corresponding to the parent node of the current directory exists. This process is executed at steps 605 and 610. If such a directory record does not exist in the regenerated file hierarchy 335, a new directory record is generated at step 615. The child field 545 of the newly generated directory record is then set to point to the current directory node record as the only child of the new directory record. At step 620, the parent identifier field 540 of the current directory node record is set to point to the newly generated directory record. The sibling field 530 of the current directory node record is set to indicate that there are no siblings for the current directory node record at step 625.

If the check executed at steps 605 and 610 indicate that there is a directory record in the regenerated file hierarchy 335 that corresponds to parent node of the current directory, then the current directory node is linked into the generalized tree structure of the parent directory node at step 630. To this end, the parent identifier field 540 of the current node is set to point to the location of the parent node record in the regenerated file hierarchy 335. The sibling field 530 of the current directory node is set to point to the same record as pointed to by the child field 545 of the parent node record. Finally, the child field 545 of the parent directory node is set to point to the location of the current directory node.

At step 635, the file system software 47 checks to determine whether the recursive directory processing is completed. In this example, the recursive directory processing is completed when the processing a sends to the root node, which has a unique and recognizable file identifier. If the root node has been reached at step 635, processing of the next file record entry in metafile 120 is begun at step 640, which returns control of the processing back to step 575. If the root node has not been reached at step 635, then processing of the next parent node in the ascending file/directory hierarchy is repeated beginning at step 605.

FIG. 15 is a logical representation of the reconstructed file system 330 and corresponds to the application of the processing steps of FIGS. 8 and 14 to a file system having the file hierarchy shown in FIG. 2. In this exemplary representation, lines 665, 670, 675, and 680 represent pointers that correspond to the content of the parent identifier fields 540 for the directory node records representing directories 105, 100, 80 and 85, respectively. Lines 645, 650, 660, 655 and 652 represent pointers that correspond to the content of the child identifier fields 545 for the directory node records representing directories 110, 100, 105, 80 and 85, respectively. Lines 685, 690, 695 and 705 represent pointers that correspond to the content of the sibling identifier fields 530 for the directory node records corresponding directories 100, 105 and 80, respectively. Lines 700, 705, 710 and 715 represent pointers that correspond to the content of the sibling identifier fields 555 for the file node records corresponding to files 90, 55, 60 and 70, respectively.

One manner of accessing data in the transaction file 220 of persistent storage unit 30 using the reconstructed file system 330 is also illustrated in FIG. 15. As shown, the file system software 47 provides a file identifier 730 for the file node record that the software is to access. In this example, the file identifier 730 points to the file node record representing file 55. The file system software 47 then uses the contents of the extents index 565 of the file node record as an index into extents pool 340 to locate the data for the file in the transaction file 220. It will be recognized, however, that the file system software 47 may use the contents of the reconstructed file system 330 in a variety of different manners other than the one illustrated in FIG. 15.

As noted above, complete verification of the integrity of a file is not performed during startup so that startup processing may be expedited. Instead, the file system software 47 may defer complete verification or verification of previously unverified portions of a transaction record corresponding to a given file until the first or subsequent time that the given file is accessed. To this end, the file system software 47 may maintain a table indicating whether or not the integrity of each transaction file record for a given file has been completely verified. Alternatively, the file system software 47 may use one or more bits of each file node record in the regenerated file hierarchy 335 to indicate whether the integrity of the transaction records for the file have been completely verified. This file verification indicator is checked by the file system software 47 the first time (or a subsequent time) that a file is accessed after the file system startup process has been completed. If the indicator shows that the transaction records of the file have not been completely verified, a verification of the transaction file records may be executed at that time. To expedite the verification process, verification of the transaction file records may be limited to the particular sections of the records that were not previously verified. For example, since the headers of most of the transaction records for the file may already have been checked during the file system startup process, the file system software need only verify the integrity of the data portions of each transaction record for the file. The verification processes may include one or more CRC processes, one or more ECC processes, etc. As shown in FIGS. 5, 6 and 7, a number of different fields in each of the transaction record headers may be dedicated to verifying the integrity of the transaction record. If the integrity checks fail and an application using the relevant error-correcting codes cannot correct the error, then a program error is reported back to the application or system that made the request to access the file contents. Once all of the transaction records for a file have been completely verified, the file system software 47 may change the verification indicator for the file accordingly.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer system comprising:
a persistent data storage;
file system code in memory storage, where the file system code is executable by a processor for managing file data and a file system structure of a plurality of files stored on the persistent data storage device; and
a transaction file maintained by an execution of the file system code, where the transaction file comprises a plurality of transaction records, and each transaction record of the plurality of transaction records comprises a header section and a data section, where the header section of each transaction record of the plurality of transaction records comprises one or more fields, each field of the one or more fields containing one or more header information items corresponding to a file transaction that is represented by each transaction record of the plurality of transaction records, where at least one first field of the one or more fields of the header section of each transaction record of the plurality of transaction records comprises a first integrity information for verifying a first integrity of the one or more header information items of the header section alone of each transaction record of the plurality of transaction records, and where at least one second field of the one or more fields of the header section of each transaction record of the plurality of transaction records comprises a second integrity information for verifying a second integrity of one or more data information items in the data section of the each transaction record of the plurality of transaction records, where the file system code is executable to implement a startup process in which a reconstructed file system is generated in a random access memory using the plurality of transaction records of the transaction file, where, when the header section of a transaction record of the plurality of transaction records meets a first predetermined criterion, the startup process uses the first integrity information in the at least one first field of the header section of the transaction record of the plurality of transaction records to verify the first integrity of the one or more header information items stored in the header section of the transaction record of the plurality of transaction records while skipping a verification of the second integrity of the one or more data information items stored in the data section of the transaction record of the plurality of transaction records as the startup process generates the reconstructed file system, where, when the header section of the transaction record of the plurality of transaction records meets a second predetermined criterion, the startup process uses the at least one first field of the header section to verify the first integrity of the one or more header information items stored in the header section of the transaction record of the plurality of transaction records and the startup process uses the at least one second field of the header section of the transaction record of the plurality of transaction records to verify the second integrity of the one or more data information items in the data section of the transaction record of the plurality of transaction records as the startup process generates the reconstructed file system, and where the file system code is executable to verify the second integrity of one or more data information items in one or more data sections of one or more transaction records of the plurality of transaction records which were not verified by the startup process, the one or more transaction records of the plurality of transaction records representing a given file of the plurality of files, when the given file of the plurality of files is accessed subsequent to a completion of the startup process.

2. A computer system comprising:

a persistent data storage device;

file system code in memory storage, where the file system code is executable by a processor for managing file data and a file system structure of a plurality of files stored on the persistent data storage device; and a transaction file maintained by an execution of the file system code, the transaction file comprising a plurality of transaction records, where each transaction record of the plurality of transaction records comprises a header section and a data section, and the header section of each transaction record of the plurality of transaction records comprises one or more fields containing one or more header information items corresponding to a file transaction that is represented by each transaction record of the plurality of transaction records, where at least one first field of the one or more fields of the header section of each transaction record of the plurality of transaction records comprises a first integrity information for verifying the first integrity of the one or more header information items of the header section alone of each transaction record of the plurality of transaction records, and where at least one second field of the one or more fields of the header section of each transaction record of the plurality of transaction records comprises a second integrity information for verifying a second integrity of one or more data information items in the data section of each transaction record of the plurality of transaction records, where the file system code is executable to implement a startup process in which a reconstructed file system is generated in a random access memory using the plurality of transaction records of the transaction file, where, when the header section of a transaction record of the plurality of transaction records indicates that the transaction record of the plurality of transaction records affects a metadata of the file system structure, the startup process uses the at least one first field of the header section to verify the first integrity of the one or more header information items in the header section of the transaction record of the plurality of transaction records and the at least one second field of the header section of the transaction record of the plurality of transaction records to verify the second integrity of the one or more data information items in the data section of the transaction record of the plurality of transaction records as the startup process generates the reconstructed file system, where, when the header section of a transaction record of the plurality of transaction records indicates that the transaction record of the plurality of transaction records does not affect the metadata of the file system structure, the startup process only verifies the first integrity of the one or more header information items of the header section of the transaction record of the plurality of transaction records using the first field of the header section of the transaction record of the plurality of transaction records while skipping a verification of the one or more data information items in the data section of the transaction record of the plurality of transaction records as the startup process generates the reconstructed file system, and where the file system code is executable to verify the second integrity of one or more data information items in one or more data sections of one or more transaction record of the plurality of transaction records which were not verified by the startup process, of each transaction record the one or more transaction record of the plurality of transaction records representing a given file of the plurality of files when the given file of the plurality of files is accessed after a completion of the startup process.

3. A computer system comprising:

a persistent data storage device;

file system code in memory storage, where the file system code is executable by a processor for managing file data and a file system structure of a plurality of files stored on the persistent data storage device; and a transaction file maintained by an execution of the file system code in a flash media, the flash media being organized into a plurality of memory blocks, where each memory block of the plurality of memory blocks comprises a plurality of memory pages, and the transaction file comprises a plurality of transaction records, where each transaction record of the plurality of transaction records comprises a header section and a data section, and the header section of each transaction record of the plurality of transaction records comprises one or more fields containing header information items corresponding to a file transaction that is represented by each transaction record of the plurality of transaction records, where at least one first field of the one or more fields of the header section of each transaction record of the plurality of transaction records comprises a first integrity information for verifying a first integrity of the one or more header information items of the header section alone of each transaction record of the plurality of transaction records, and where at least one second field of the one or more fields of the header section of each transaction record of the plurality of transaction records comprises a second integrity information for verifying a second integrity of one or more data information items in the data section of the transaction record of the plurality of transaction records, where the file system code is executable to implement a startup process in which a reconstructed file system is generated in a random access memory, and the startup process uses the first field of the header section of a first occurring transaction record in a sequence of transaction records of the plurality of transaction records to verify the first integrity of the one or more header information items in the header section of the first occurring transaction record in the sequence of transaction records of the plurality of transaction records while skipping a verification of one or more tailing transaction records in the sequence of transaction records of the plurality of transaction records when the first occurring transaction record and the one or more tailing transaction records in the sequence of transaction records of the plurality of transaction records are stored in a same memory block of the plurality of memory blocks and affect a same file of the plurality of files, and where the file system code is executable to verify the first integrity of one or more header information items of one or more header sections of the one or more transaction records of the plurality of transaction records which were not verified by the startup process and/or the second integrity of one or more data information items of one or more data sections of one or more transaction records of the plurality of transaction records which were not verified by the startup process, the one or more transaction records representing a given file of the plurality of files, when the given file of the plurality of files is accessed after a completion of the startup process.

4. The computer system as claimed in claim 1 where the startup process verifies the one or more header information items stored in the header section of two or more transaction records of the plurality of transaction records.

5. The computer system as claimed in claim 1 where the header section of each transaction record of the plurality of transaction records comprises an error correction code, and where the file system code is executable to use the error correction code of the header section of each transaction record of the plurality of transaction records to correct one or more errors in the one or more header information items stored in the header section of each transaction record of the plurality of transaction records.

6. The computer system as claimed in claim 1 where the persistent data storage device comprises a flash media.

7. The computer system as claimed in claim 6 where the flash media is organized into a plurality of memory blocks, and where each memory block of the plurality of memory blocks comprises a plurality of memory pages.

8. The computer system as claimed in claim 1 where the reconstructed file system comprises a regenerated file hierarchy and an extents table.

9. The computer system as claimed in claim 8 where the regenerated file hierarchy is organized by the file system code as an inverted file hierarchy.

10. The computer system as claimed in claim 1 where the startup process skips the verification of the second integrity of the one or more data information items stored in the data section of the transaction record of the plurality of transaction records unless the transaction record of the plurality of transaction records affects a metadata of the file system structure, and where the startup process verifies the one or more header information items stored in the header section of the transaction record of the plurality of transaction records and the one or more data information items stored in the data section of the transaction record of the plurality of transaction records when the transaction record affects the metadata of the file system structure.

11. The computer system as claimed in claim 7 where the startup process verifies the one or more header information items in the header section of a first occurring transaction record in a sequence of transaction records of the plurality of transaction records while skipping the any verification of one or more tailing transaction records of the sequence of transaction record of the plurality of transaction records when the first occurring transaction record and the one or more tailing transaction records in the sequence of transaction records of the plurality of transaction records are stored in a same memory block of the plurality of memory blocks and affect a same file of the plurality of files.

12. The computer system as claimed in claim 2 where the startup process verifies the one or more header information items stored in the header section of two or more transaction records of the plurality of transaction records.

13. The computer system as claimed in claim 2 where the header section of each transaction record of the plurality of transaction records comprises an error correction code, and where the file system code is executable to use the error correction code of the header section of each transaction record of the plurality of transaction records to correct one or more header information items stored in the header section of each transaction record of the plurality of transaction records.

14. The computer system as claimed in claim 2 where the persistent data storage device comprises a flash media.

15. The computer system as claimed in claim 14 where the flash media is organized into a plurality of memory blocks, and where each memory block of the plurality of memory blocks comprises a plurality of memory pages.

16. The computer system as claimed in claim 2 where the reconstructed file system comprises a regenerated file hierarchy and an extents table.

17. The computer system as claimed in claim 16 where the regenerated file hierarchy is organized by the file system code as an inverted file hierarchy.

18. The computer system as claimed in claim 14 where the startup process verifies the one or more header information items in the header section of a first occurring transaction record in a sequence of transaction records of the plurality of transaction records while skipping the verification of one or more tailing transaction records in the sequence of transaction records of the plurality of transaction records when the first occurring transaction record and the one or more tailing transaction records in the sequence of transaction records of the plurality of transaction records are stored in the a memory block of the plurality of memory blocks and affect a same file of the plurality of files.

19. The computer system as claimed in claim 3 where the startup process verifies one or more header information items stored in the header section of two or more transaction records of the plurality of transaction records.

20. The computer system as claimed in claim 3 where the header section of each transaction record of the plurality of transaction records comprises an error correction code, and where the startup process uses the error correction code of the header section of each transaction record of the plurality of transaction records to correct one or more errors in the one or more header information items stored in the header section of each transaction record of the plurality of transaction records.

21. The computer system as claimed in claim 3 where the reconstructed file system comprises a regenerated file hierarchy and an extents table.

22. The computer system as claimed in claim 21 where the regenerated file hierarchy is organized by the file system code as an inverted file hierarchy.

23. The computer system as claimed in claim 3 where the startup process skips the verification of the one or more data information items stored in the data section of a transaction record of the plurality of transaction records unless the transaction record of the plurality of transaction records affects a metadata of the file system structure, and where the startup process verifies the one or more header information items stored in the header section of the transaction record of the plurality of transaction records and the one or more data information items stored in the data section of the transaction record of the plurality of transaction records when the transaction record of the plurality of transaction records affects the metadata of the file system structure.

24. The computer system as claimed in claim 1, where the file system code is executable to maintain a table indicating whether or not the first integrity of the one or more header information items in the header section of one or more transaction records of the plurality of transaction records for the given file of the plurality of files and whether or not the second integrity of the one or more data information items in the data section of the one or more transaction records of the plurality of transaction records for the given file of the plurality of files have been verified.

25. The computer system as claimed in claim 24, where the file system code is executable to use the table to determine whether to verify the one or more header information items of one or more previously skipped header sections of the one or more transaction records of the plurality of transaction records representing the given file of the plurality of files and/or the one or more data information items of one or more previously skipped data sections of the one or more transaction records of the plurality of transaction records representing the given file of the plurality of files when the given file of the plurality of files is accessed after the completion of the startup process.

26. The computer system as claimed in claim 1, where the file system code is executable to use one or more bits of a file node record in the reconstructed file system to indicate whether the first integrity of the one or more header information items of the header section of each transaction record of the plurality of transaction records for a file of the plurality of files at a file node and/or the second integrity of the one or more data information items of the data section of each transaction record of a plurality of transaction records for the file of the plurality of files at the file node have been verified.

27. The computer system as claimed in claim 1, where the file system code is executable to solely verify the first integrity of the one or more data information items in the data section of one or more previously skipped data sections of one or more transaction records of the plurality of transaction records representing the given file of the plurality of files when the given file of the plurality of files is accessed after the completion of the startup process.

28. The computer system as claimed in claim 2, where the file system code is executable to maintain a table indicating whether or not the first integrity of the one or more header information items in the header section of one or more transaction records of the plurality of transaction records for the given file of the plurality of files and the second integrity of the one or more data information items in the data section of the one or more transaction records of the plurality of transaction records for the given file of the plurality of files have been verified.

29. The computer system as claimed in claim 28, where the file system code is executable to use the table to determine whether to verify the one or more header information items of one or more previously skipped header sections of the one or more transaction records of the plurality of transaction records representing the given file of the plurality of files and/or one or more data information items of one or more previously skipped data sections of the one or more transaction records of the plurality of transaction records representing the given file of the plurality of files when the given file of the plurality of files is accessed after the completion of the startup process.

30. The computer system as claimed in claim 2, where the file system code is executable to use one or more bits of a file node record in the reconstructed file system to indicate whether the first integrity of the one or more header information items in the header section of one or more transaction records of the plurality of transaction records for a file of the plurality of files at a file node and/or the second integrity of the one or more data information items in the data section of one more transaction records of the plurality of transaction records for the file of the plurality of files at the file node have been verified.

31. The computer system as claimed in claim 3, where the file system code is executable to maintain a table indicating whether or not the first integrity of the one or more header information items in the header section of one or more transaction records of the plurality of transaction records for the given file of the plurality of files and the second integrity of the one or more data information items of the data section of the one or more transaction records of the plurality of transaction records for the given file of the plurality of files has been verified.

32. The computer system as claimed in claim 31, where the file system code is executable to use the table to determine whether to verify the one or more header information items of one or more previously skipped header sections of the one or more transaction records of the plurality of transaction records representing the given file of the plurality of files and/or one or more data information items of one or more previously skipped data sections of the one or more transaction records of the plurality of transaction records representing the given file of the plurality of files when the given file of the plurality of files is accessed after the completion of the startup process.

33. The computer system as claimed in claim 3, where the file system code is executable to use one or more bits of a file node record in the reconstructed file system to indicate whether the first integrity of the one or more header information items of the header section of one or more transaction records of the plurality of transaction records for a file of the plurality of files at a file node and/or the second integrity of the one or more data information items of the data section of one or more transaction records of the plurality of transaction records for the file of the plurality of files at the file node have been verified.

* * * * *